United States Patent
Inoue et al.

(10) Patent No.: US 6,587,882 B1
(45) Date of Patent: Jul. 1, 2003

(54) MOBILE IP COMMUNICATION SCHEME USING VISITED SITE OR NEARBY NETWORK AS TEMPORAL HOME NETWORK

(75) Inventors: Atsushi Inoue, Kanagawa (JP); Masahiro Ishiyama, Tokyo (JP); Atsushi Fukumoto, Kanagawa (JP); Yoshiyuki Tsuda, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/128,012

(22) Filed: Aug. 3, 1998

(30) Foreign Application Priority Data

Aug. 1, 1997 (JP) .......................................... 09-207862

(51) Int. Cl.$^7$ ........................ G06F 15/16; G06F 15/177
(52) U.S. Cl. ...................... 709/227; 709/228; 709/220; 709/221; 709/245; 370/331; 370/338; 455/433
(58) Field of Search ................................ 709/250, 219, 709/220, 222, 221, 227, 228, 245; 370/371, 338; 455/433

(56) References Cited

U.S. PATENT DOCUMENTS

| | | | | |
|---|---|---|---|---|
| 5,159,592 A | * | 10/1992 | Perkins ........................ | 370/338 |
| 5,708,655 A | * | 1/1998 | Toth et al. ................... | 370/313 |
| 5,745,699 A | * | 4/1998 | Lynn et al. .................. | 709/245 |
| 5,825,759 A | * | 10/1998 | Liu .............................. | 370/331 |
| 5,845,079 A | * | 12/1998 | Wada et al. ................. | 709/223 |
| 5,845,211 A | * | 12/1998 | Roach, Jr. ................... | 455/436 |
| 5,862,345 A | * | 1/1999 | Okanoue et al. ........... | 709/338 |
| 5,898,780 A | * | 4/1999 | Liu et al. ..................... | 380/25 |
| 5,905,955 A | * | 5/1999 | Bamburak et al. .......... | 455/434 |
| 5,915,214 A | * | 6/1999 | Reece et al. ................ | 455/406 |
| 5,918,016 A | * | 6/1999 | Brewer et al. .............. | 709/220 |
| 6,012,100 A | * | 1/2000 | Frailong et al. ............ | 709/250 |
| 6,052,725 A | * | 4/2000 | McCann et al. ............ | 709/223 |
| 6,130,892 A | * | 10/2000 | Short et al. ................. | 370/401 |
| 6,172,986 B1 | * | 1/2001 | Watanuki et al. ........... | 370/466 |
| 6,195,705 B1 | * | 2/2001 | Leung ......................... | 709/245 |
| 6,219,715 B1 | * | 4/2001 | Ohno et al. ................. | 709/245 |
| 6,240,089 B1 | * | 5/2001 | Okanoue et al. ........... | 370/390 |

OTHER PUBLICATIONS

Solomon, J. et al., "Mobile–IPv4 Configuration Option for PPP IPCP", Internet RFC 2002, Feb. 1998.*
Droms, "Dynamic Host Configuration Protocol", RFC 2131, pp. 1–45 Mar. 1997.*
IBM Network Working Group, "Standards Track", *Request for Comments: 2002, IP Mobility Support*, (Oct. 1996).

* cited by examiner

Primary Examiner—Glenton B. Burgess
Assistant Examiner—Bradley Edelman
(74) Attorney, Agent, or Firm—Foley & Lardner

(57) ABSTRACT

A mobile IP communication scheme in which a visited site or nearby network of a mobile computer is utilized as a temporal home network of a mobile computer. The mobile computer exchanges a message with a mobile computer management device provided in a visited site or nearby network from a visited site, so as to acquire a network configuration information of the visited site or nearby network, and sets the acquired network configuration information in a communication program to be used in carrying out communications. The mobile computer management device leases a temporal home address to be used by an externally located mobile computer in response to a request message from the mobile computer, and registers the mobile computer as a mobile node which regards a network to which the mobile computer management device belongs as a home network, in response to a registration message from the mobile computer.

1 Claim, 16 Drawing Sheets

(1) ACQUISITION OF CARE-OF-ADDRESS
(2) ACQUISITION OF TEMPORAL HOME ADDRESS
(3) MOBILE IP REGISTRATION
(4) EXCHANGE OF QUERY & ANSWER MESSAGES (1) ACQUISITION OF CARE-OF-ADDRESS
(2) ACQUISITION OF TEMPORAL HOME ADDRESS
(3) MOBILE IP REGISTRATION
(4) EXCHANGE OF QUERY & ANSWER MESSAGES

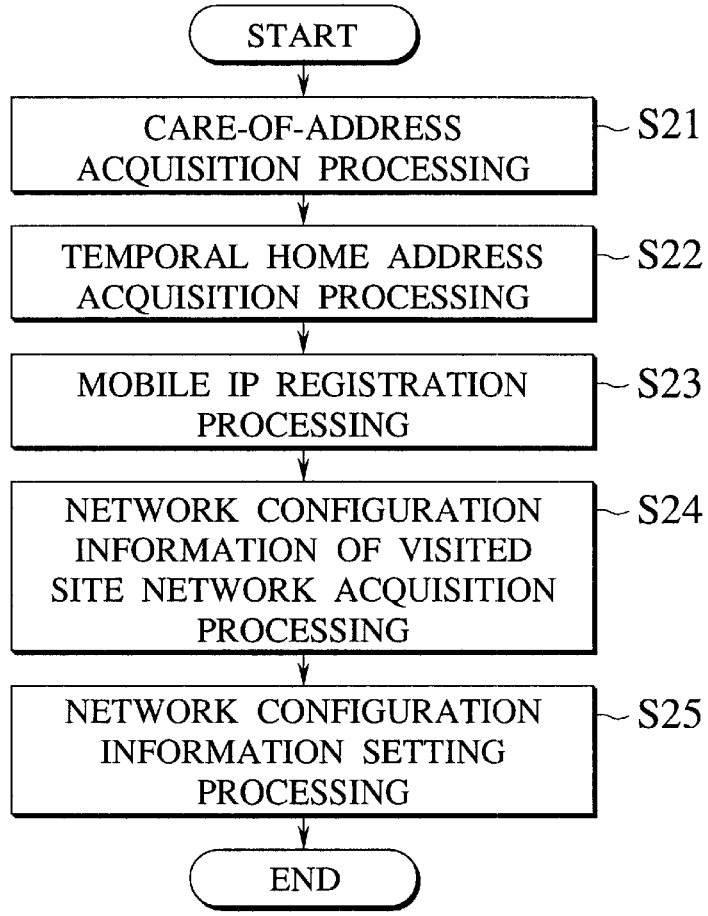
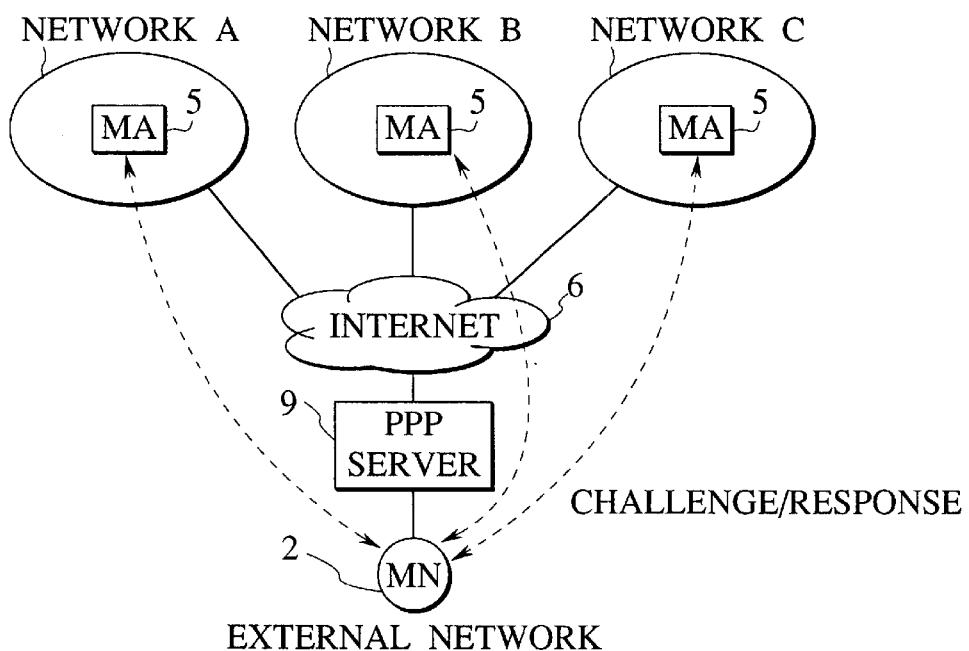

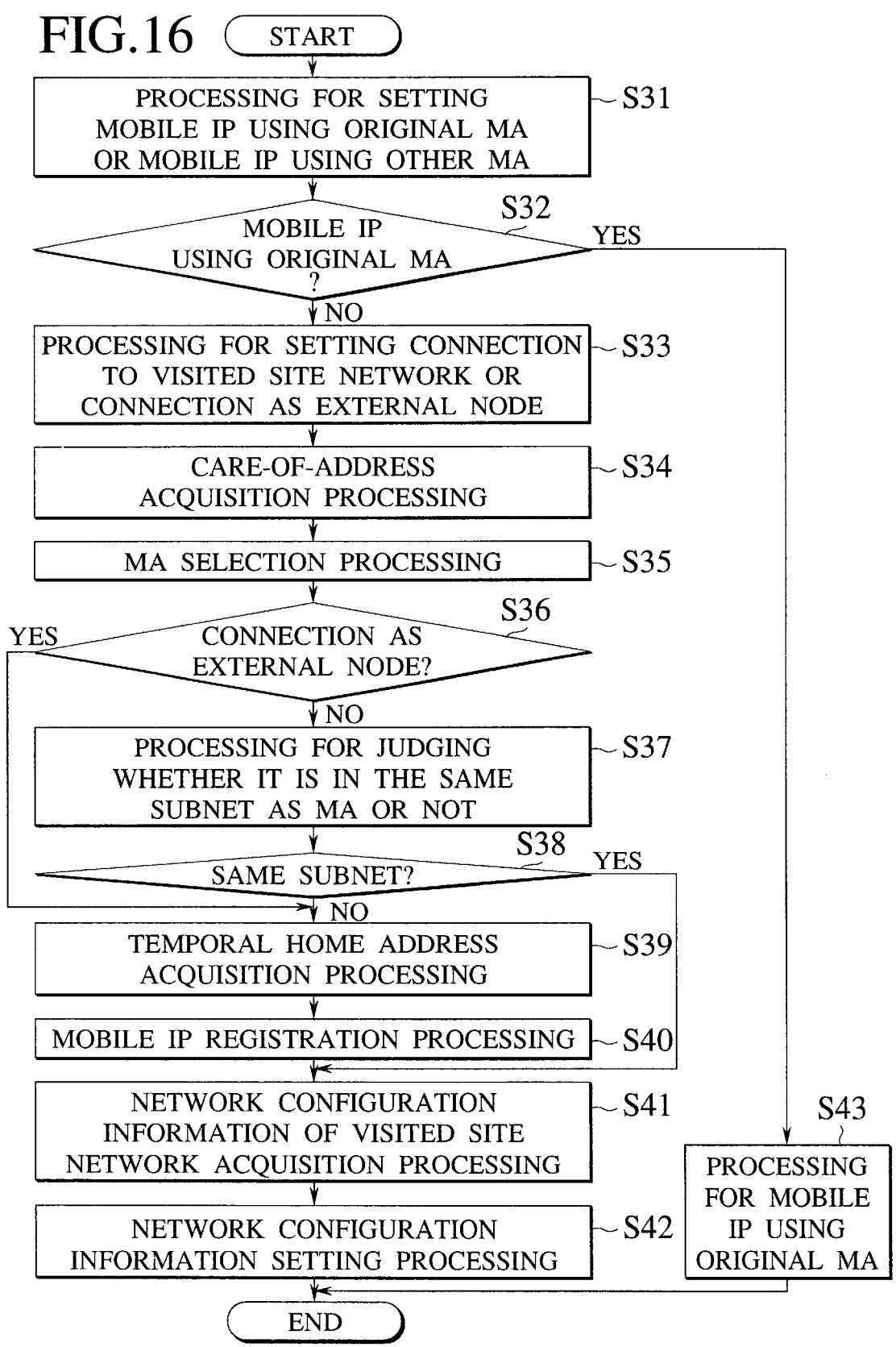

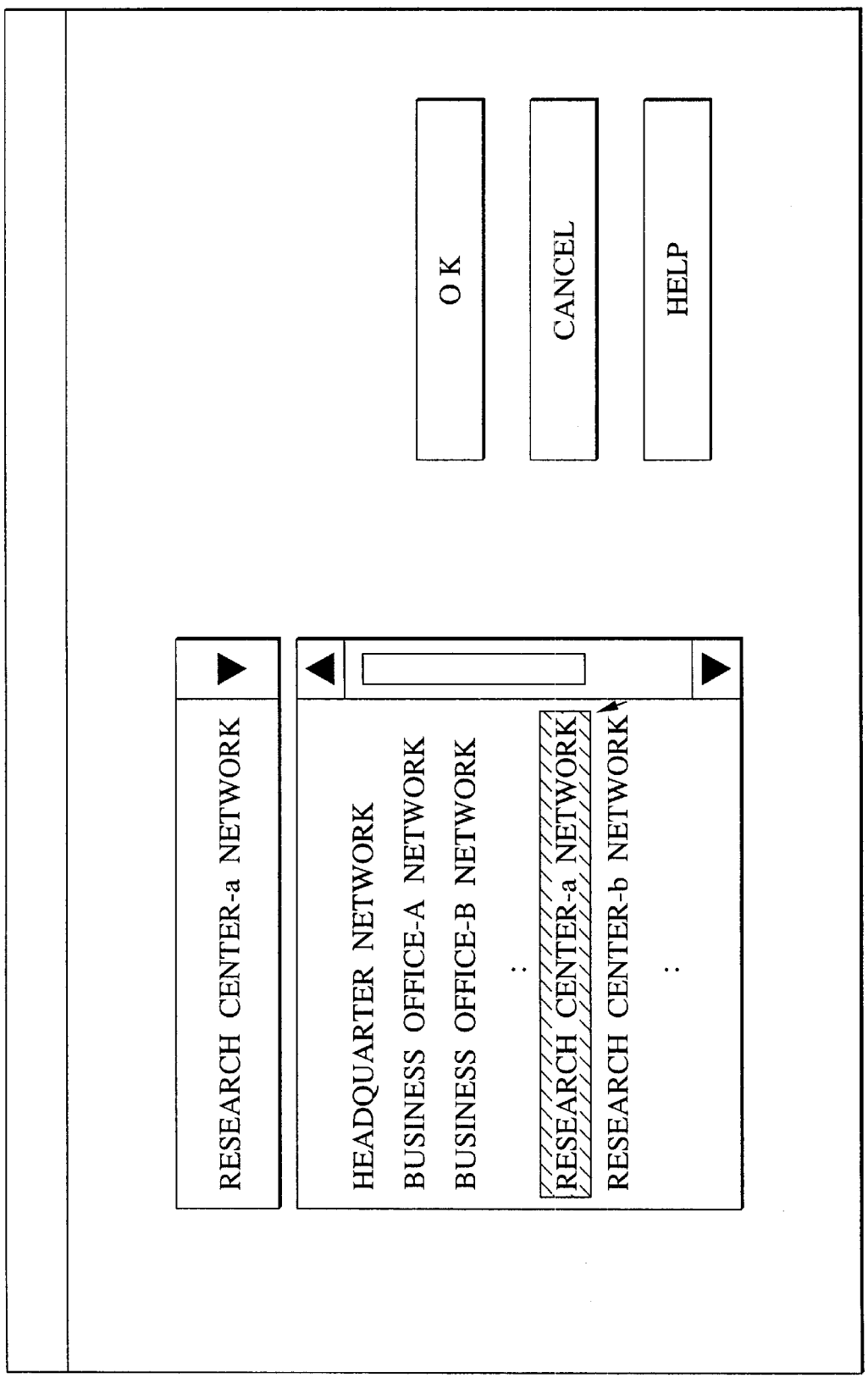

(1) MOBILE IP REGISTRATION (2) RESPONSE MESSAGE CONTAINING RESOURCE SERVER INFORMATION (3) QUERY MESSAGE FOR NETWORK CONFIGURATION INFORMATION (SUB) NETWORK (1) ADDRESS LEASING REQUEST MESSAGE (2) RESPONSE MESSAGE CONTAINING TEMPORAL ADDRESS & RESOURCE SERVER INFORMATION (3) QUERY MESSAGE FOR NETWORK CONFIGURATION INFORMATION

MOBILE IP COMMUNICATION SCHEME USING VISITED SITE OR NEARBY NETWORK AS TEMPORAL HOME NETWORK

BACKGROUND OF THE INVENTION

1. Field of the Invention

The present invention relates to a mobile IP communication scheme, and more particularly, to a mobile computer device capable of carrying out communications while moving over a plurality of inter-connected networks, a mobile computer management device and a mobile information management device for protecting necessary information to the mobile computer device and relaying data packets transmitted to the mobile computer device according to the need, and a communication control method used by these devices.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used.

In particular, in recent years, the use of the world's largest computer network called Internet has become very popular, and there are new computer businesses for connecting to the Internet and utilizing open information and services, or for providing information and services to external users who make accesses through the Interest. In addition, new technological developments are made in relation to the use of the Internet.

Also, in conjunction with the spread of such networks and the advance of small portable terminal technology, there are technological developments regarding the mobile computing. In the mobile computing, a user carries along a portable computer or terminal and makes communications while moving over networks and there is a need for a scheme that manages a changing address of a mobile computer on a network during such a communication in order to route the communication content correctly. As a protocol for supporting such mobile communications, there is a scheme called mobile IP which is currently in a process of being standardized by the mobile-IP working group of the IETF (see IETF RFC2002, IP mobility support (C. Perkins)).

In the mobile IP, a module (home agent) for managing a location information of the mobile computer is provided in a network to which the mobile computer originally belongs, and when the mobile computer moves, the mobile computer sends a registration message indicating a current location to this home agent. When this registration message is received, the home agent carries out a routing control in which the home agent acquires data destined to the mobile computer that is transmitted to an original address (home address) of the mobile computer and transfers it to the current location of the mobile computer automatically by encapsulating it inside a packet destined to the registered current location address of the mobile computer.

FIG. 19 shows this situation where a home agent (HA) 105 is playing this role with respect to a mobile computer 102. Namely, when the mobile computer 102 moves from a home network 1a to a network 1b, the mobile computer 102 sends a registration message indicating a current location to the home agent 105, and the home agent 105 that received this registration message carries out a control for transferring data transmitted to the original address (home address) of the mobile computer 102 to the current location of the mobile computer 102.

Now, in the case of carrying out a communication from a visited site using this mobile IP scheme, the mobile computer will always receive data through the home agent of the home network. However, when the mobile computer moves far away from the home agent, there is a possibility for considerably lowering the performance of a communication program because packets are always routed via the home agent. This is the case not only when the physical distance between the visited site network and the home network is large but also when a route between the visited site network and the home network involves a path at which many data packets are jamming.

Namely, the communication method using the mobile IP has a scalability that guarantees a continual communication regardless of a location on the IP network to which the mobile computer moves, but it does not necessarily guarantee that the communication can be continued comfortably.

Also, another advantage of the mobile IP scheme is that it is possible to make accesses to various resources of the home site by using attributes given before moving, because accesses are made by packets originating from an address in the home network (home address) even when the mobile computer is located at the visited site. However, in general, in the case of making an access to an information unrelated to the home site (as in the case of making an access to a Web page on the third party network or to a local printer at the visited site, for example), there is no need to carry out communications via the home network using the mobile IP, and it suffices to just use an address (temporal address) that is temporarily assigned at the visited site.

Yet, there are some recent network communication softwares in which a proper communication cannot be realized by just acquiring a temporal address alone at the visited site. For example, at a site where a network is constructed using private addresses, an address conversion is carried out by using a server called proxy server at a time of making an access to an external site, so that it is necessary for the communication software to make a setting of an IP address of the proxy server. Also, in the case where a DNS (Domain Name System) server is provided at each site, the use of the DNS server can be convenient as it becomes possible to make an access to a resource using a host name rather than an IP address, but in such a case it is also necessary to make a setting of an IP address of the DNS server in address.

In other words, in the case of trying to receive a network service using a temporal address borrowed from some network, without using the mobile IP, it is necessary to obtain a resource information (such as that of the proxy server or the DNS server mentioned above) of that network. Such an information is freely obtainable for a network manager in general, but for a general user, it is difficult to handle such an information and it is also difficult to make a proper setting of such an information at a proper portion of the communication program.

As described above, in general, in the case of supporting a mobile computer using the mobile IP scheme, communications with a home agent of a home network can be very difficult depending on a moved location of the mobile computer, and this fact can adversely affect the operation performance of a communication program in some cases.

On the other hand, when a scheme for acquiring a temporal address at a visited site and using it in carrying out communications is adopted, it becomes necessary to obtain various kinds of network configuration information (such as that of a proxy server or a DNS server in the case of WWW access, or that of a Certificate Server in the case of SSL (data encryption) communication, for example), besides an address. In order to make a proper setting of such an information, a thorough understanding of a network environment at a visited site is required so that it is quite difficult to do for a beginner who has no knowledge regarding networks.

Thus, conventionally, in the case of using a program such a browser while moving over networks, it has been necessary to make a proper setting of various kinds of environmental information in addition to acquiring an IP address at a visited site, and it has been very inconvenient especially for an end-user who has no knowledge regarding networks.

As a possible solution to this problem, there has been a proposition of a scheme called mobile IP in which an environment of a home network to which a host is originally connected can be utilized even at a visited site. In this scheme, there is no need for making an extra setting, but the moving to a location far away from the home network can be disadvantageous from a viewpoint of the performance of packet exchange with the home network, and can also adversely affect the operation performance of programs.

SUMMARY OF THE INVENTION

It is therefore an object of the present invention to provide a mobile computer device and a communication control method, wherein when a mobile compute device capable of carrying out communications while moving over inter-connected networks (such as Internet or Intranet) operates a program at a visited site, it is possible to construct a mobile IP communication environment in which a visited site network or a nearby network is regarded as a home network.

It is another object of the present invention to provide a mobile computer device, a mobile computer management device, a mobile information management device and a communication control method, wherein when a mobile computer device capable of carrying out communications while moving over inter-connected networks (such as Internet or Intranet) operates a program at a visited site, it is possible to carry out a setting of a communication program such as browser suitable for a visited site network or a nearby network automatically.

It is another object of the present invention to provide a mobile computer management device to be provided in some network and a communication control method, which are capable of providing an environment with respect to a mobile computer device capable of carrying out communications while moving over inter-connected networks (such as Internet or Intranet), in which it is possible to construct a mobile IP communication environment where the mobile computer device can regard a network to which the mobile computer management device belongs as a home network.

According to one aspect of the present invention there is provided a mobile computer device capable of carrying out communications while moving over inter-connected networks, comprising: an exchange processing unit for exchanging a message with a management device provided in a visited site network or a nearby network to which the mobile computer device is connected through a network from a visited site, so as to acquire a network configuration information of the visited site network or the nearby network, the management device having a management function for enabling the communication by the mobile computer device at the visited site; and a setting unit for setting the network configuration information acquired according to the message in a communication program to be used in carrying out the communications.

According to another aspect of the present invention there is provided a mobile computer device capable of carrying out communications while moving over inter-connected networks, comprising: a selection unit for selecting one of a plurality of mobile computer management devices provided in a plurality of networks, each mobile computer management device having functions for managing a moving location of each registered mobile computer device and transferring data destined to each registered mobile computer device to its moving location; and a message exchange unit for exchanging a message with a selected mobile computer management device from a visited site, so as to register the mobile computer device to the selected mobile computer management device as a mobile node which regards one network to which the selected mobile computer management device belongs as a home network.

According to another aspect of the present invention there is provided a mobile computer management device to be provided in a prescribed network among inter-connected networks, comprising: an address leasing unit for leasing a temporal address to be used by a mobile computer in response to a request message from the mobile computer; a moving management unit for receiving a registration message from the mobile computer to which the the temporal address is leased, and registering and managing a correspondence between the temporal address and a current location of the mobile computer; a network configuration information response unit for returning to the mobile computer one message containing a network configuration information of one network to which the mobile computer management device belongs or a resource server information that has the network configuration information; and a data transfer unit for capturing data transmitted to the temporal address, and transferring the data to the current location of the mobile computer according to the registered correspondence.

According to another aspect of the present invention there is provided a mobile computer management device, to be provided in a prescribed network among inter-connected networks, for managing mobile IP communications of a registered mobile computer, comprising: an address leasing unit for leaving a temporal home address to be used by a mobile computer located outside a subnet to which the mobile computer management device is connected, in response to a request message from the mobile computer; and a registration unit for registering the mobile computer as a mobile node to be managed by the mobile computer management device, in response to a registration message from the mobile computer to which the temporal home address is leased.

According to another aspect of the present invention there is provided a mobile information management device for use in conjunction with a mobile computer management device which is provided in a prescribed network among inter-connected networks and managing mobile IP communications of a registered mobile computer, the mobile information management device comprising: an address leasing unit for leasing a temporal address to be used by a mobile computer located outside a subnet to which the mobile information management device is connected, in response to a request message from the mobile computer; and an information providing unit for providing a network configuration information of a network to which the mobile information management device belongs or a resource server information that has the network configuration information, to the mobile computer.

According to another aspect of the present invention there is provided a communication control method for a mobile computer device capable of carrying out communications while moving over inter-connected networks, the method comprising the steps of: exchanging a message with a management device provided in visited site network or a nearby network to which the mobile computer device is connected through a network from a visited site, so as to acquire a network configuration information of the visited site network or the nearby network, the management device having a management function for enabling the communications by the mobile computer device at the visited site; and setting the network configuration information acquired according to the message in a communication program to be used in carrying out the communications.

According to another aspect of the present invention there is provided a communication control method for a mobile computer device capable of carrying out communications while moving over inter-connected networks, the method comprising the steps of: selecting one of a plurality of mobile computer management devices provided in a plurality of networks, each mobile computer management device having functions for managing a moving location of each registered mobile computer device and transferring data destined to each registered mobile computer device to its moving location; and exchanging a message with a selected mobile computer management device from a visited site, so as to register the mobile computer device to the selected mobile computer management device as a mobile node which regards one network to which the selected mobile computer management device belongs as a home network.

According to another aspect of the present invention there is provided a communication control method for a mobile computer management device to be provided in a prescribed network among inter-connected networks, the method comprising the steps of: leasing a temporal address to be used by a mobile computer in response to a request message from the mobile computer; receiving a registration message from the mobile computer to which the temporal address is leased, and registering and managing a correspondence between the temporal address and a current location of the mobile computer; returning to the mobile computer one message containing a network configuration information of one network to which the mobile computer management device belongs or a resource server information that has the network configuration information; and capturing data transmitted to the temporal address, and transferring the data to the current location of the mobile computer according to the registered correspondence.

According to another aspect of the present invention there is provided a communication control method for a mobile computer management device, to be provided in a prescribed network among inter-connected networks, for managing while IP communications of a registered mobile computer, the method comprising the steps of: leasing a temporal home address to be used by a mobile computer located outside a subnet to which the mobile computer management device is connected, in response to a request message from the mobile computer; and registering the mobile computer as a mobile node to be managed by the mobile computer management device, in response to a registration message from the mobile computer to which the temporal home address is leased.

According to another aspect of the present invention there is provided a communication control method for a mobile information management device for use in conjunction with a mobile computer management device which is provided in a prescribed network among inter-connected networks and managing mobile IP communications of a registered mobile computer, the method comprising the steps of: leasing a temporal address to be used by a mobile computer located outside a subnet to which the mobile information management device is connected, in response to a request message from the mobile computer; and providing a network configuration information of a network to which the mobile information management device belongs or a resource server information that has the network configuration information, to the mobile computer.

According to another aspect of the present invention there is provided an article of manufacture, comprising: a computer usable medium having a computer readable program code means embodied therein for causing a computer to function as a mobile computer device capable of carrying out communications while moving over inter-connected networks, the computer readable program code means includes: first computer readable program code means for causing said computer to exchange a message with a management device provided in a visited site network or a nearby network to which the mobile computer device is connected through a network from a visited site, so as to acquire a network configuration information of the visited site network or the nearby network, the management device having a management function for enabling the communications by the mobile computer device at the visited site; and second computer readable program code means for causing said computer to set the network configuration information acquired according to the message in a communication program to be used in carrying out the communications.

According to another aspect of the present invention there is provided an article of manufacture, comprising: a computer usable medium having computer readable program code means embodied therein for causing a computer to function as a mobile computer device capable of carrying out communications while moving over inter-connected networks, the computer readable program code means includes: first computer readable program code means for causing said computer to select one of a plurality of mobile computer management devices provided in a plurality of networks, each mobile computer management device having functions for managing a moving location of each registered mobile computer device and transferring data destined to each registered mobile computer device to its moving location; and second computer readable program code means for causing said computer to exchange a message with a selected mobile computer management device from a visited site, so as to register the mobile computer device to the selected mobile computer management device as a mobile node which regards one network to which the selected mobile computer management device belongs as a home network.

According to another aspect of the present invention there is provided an article of manufacture, comprising: a computer usable medium having computer readable program code means embodied therein for causing a computer to function as a mobile computer management device to be provided in a prescribed network among inter-connected networks, the computer readable program code means includes: first computer readable program code means for causing said computer to lease a temporal address to be used by a mobile computer in response to a request message from the mobile computer; second computer readable program code means for causing said computer to receive a registration message from the mobile computer to which the temporal address is leased, and register and manage a correspondence between the temporal address and a current location of the mobile computer; third computer readable program code means for causing said computer to return to the mobile computer one message containing a network configuration information of one network to which the mobile computer management device belongs or a resource server information that has the network configuration information; and fourth computer readable program code means for causing said computer to capture data transmitted to the temporal address, and transfer the data to the current location of the mobile computer according to the registered correspondence.

According to another aspect of the present invention there is provided an article or manufacture, comprising: a computer usable medium having computer readable program code means embodied therein for causing a computer to function as a mobile computer management device, to be provided in a prescribed network among inter-connected networks, for managing mobile IP communications of a registered mobile computer, the computer readable program code means includes: first computer readable program code means for causing said computer to lease a temporal home address to be used by a mobile computer located outside a subnet to which the mobile computer management device is connected, in response to a request message from the mobile computer; and second computer readable program code means for causing said computer to register the mobile computer as a mobile node to be managed by the mobile computer management device, in response to a registration message from the mobile computer to which the temporal home address is leased.

According to another aspect of the present invention there is provided an article of manufacture, comprising: a computer usable medium having computer readable program code means embodied therein for causing a computer to function as a mobile information management device for use in conjunction with a mobile computer management device which is provided in a prescribed network among inter-connected networks and managing mobile IP communications of a registered mobile computer, the computer readable program code means includes: first computer readable program code means for causing said computer to lease a temporal address to be used by a mobile computer located outside a subnet to which the mobile information management device is connected, in response to a request message from the mobile computer; and second computer readable program code means for causing said computer to provide a network configuration information of a network to which the mobile information management device belongs or a resource server information that has the network configuration information, to the mobile computer.

Other features and advantages of the present invention will become apparent from the following description taken in conjunction with the accompanying drawings.

BRIEF DESCRIPTION OF THE DRAWINGS

FIG. 8 is a diagram showing an exemplary format of a query message used in one embodiment of the present invention.

FIG. 14 is a flow chart of an exemplary operation procedure for a mobile computer in the case shown in FIG. 12.

FIG. 15 is a schematic diagram for explaining one possible method for selecting a mobile computer management device at a mobile computer in the case showing in FIG. 12.

FIG. 16 is a flow chart of an exemplary operation procedure for a mobile computer in one exemplary situation (example 1) according to one embodiment of the present invention.

FIG. 17 is a diagram showing a user setting window that can be used in one embodiment of the present invention.

DETAILED DESCRIPTION OF THE PREFERRED EMBODIMENTS

Referring now to FIG. 1 to FIG. 18, FIG. 20 and FIG. 21, one embodiment of a mobile IP communication scheme according to the present invention will be described in detail.

Figure 1:
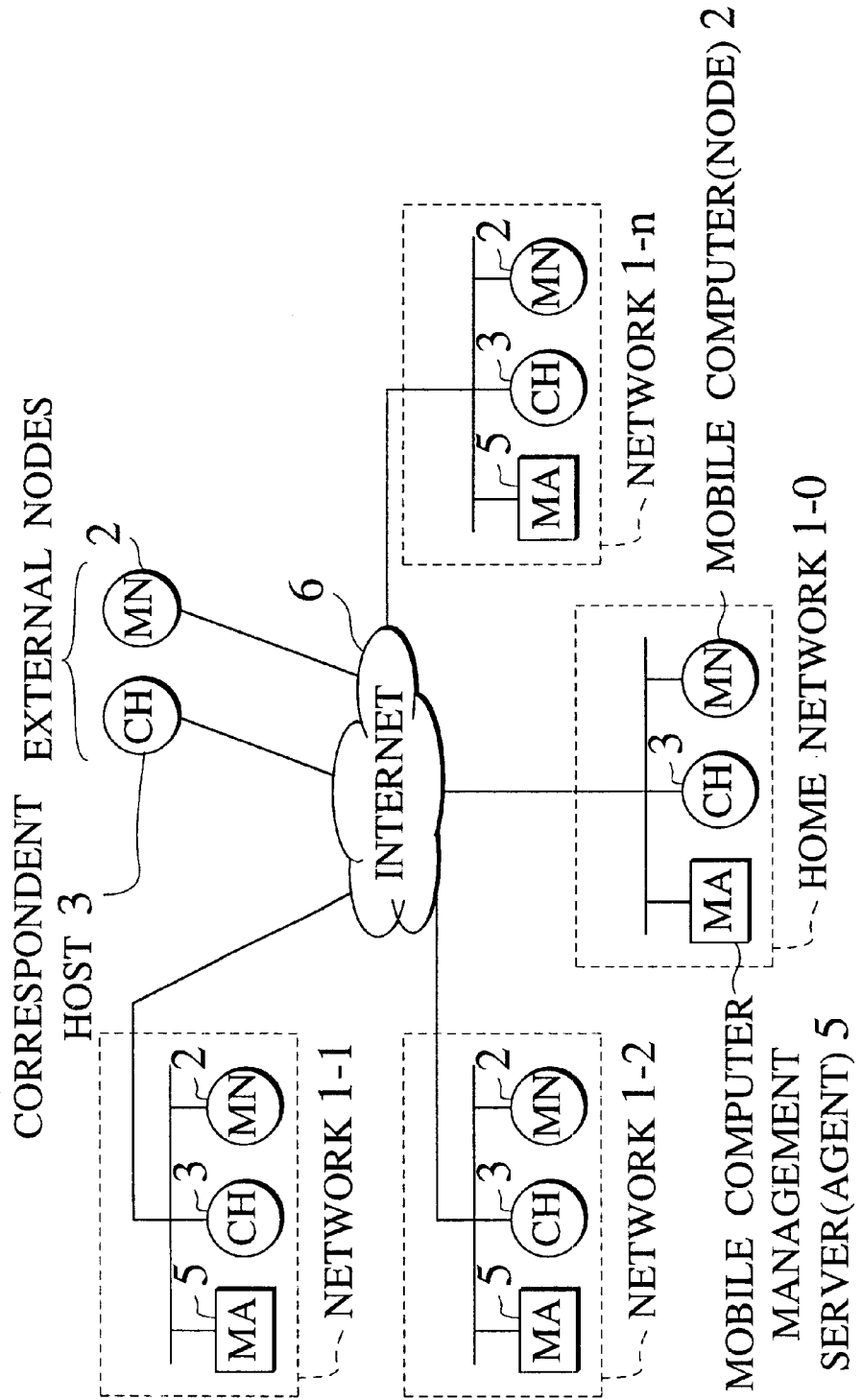
FIG. 1 is a schematic diagram showing an exemplary basic configuration of inter-connected networks to which the present invention is applied.

FIG. 1 shows an exemplary basic configuration of interconnected networks to which the present invention is applied. In this embodiment, a home network 1-0 and a plurality of visited site networks 1-1 to 1-n are interconnected through the Internet 6, and a mobile computer (MN) 2 and its correspondent host (CH 3 are connected within these networks or to the Internet 6 as external nodes. In each of the home network 1-0 and the visited site networks 1-1 to 1-m, there is provided a mobile computer management server (MA: Mobile Agent) 5 for managing the mobile computer 2 and providing the necessary information.

Note that this embodiment will be described by focusing on a mobile computer which has the network 1-0 as its home position so that the network 1-0 is referred to as a home network while the networks 1-1 to 1-n are referred to as visited site networks, but in the case of focusing on a mobile computer which has any one of the networks 1-1 to 1-n as its home position, that one of the networks 1-1 to 1-n will be a home network and the network 1-0 will be a visited site network. In other words, all of the networks 1-0 to 1-n are basically equivalent except for some functions, services, configurations, etc. which are unique to each network.

The mobile computer 2 can carry out communications with the correspondent host 3 using an arbitrary communication program, but in this embodiment an exemplary case of carrying out communications with a Web server using a WWW browser will be described.

Roughly speaking, the mobile computer management server 5 of this embodiment is an extension of a home agent in the mobile IP protocol as specified by RFC 2002, which plays a role of a home agent with respect to a mobile computer whose home network is a network to which the mobile computer management server 5 itself belongs, as well as a role of a home agent with respect to a mobile computer whose home network is another network originally and which tries to carry out the mobile IP communications by regarding a network to which the mobile computer management server 5 itself belongs as a home network. In addition, in this embodiment, a function for providing a network configuration information to the mobile computer 2 is also provided in the mobile computer management server 5.

Also, roughly speaking, the mobile computer 2 of this embodiment is an extension of a mobile node in the mobile IP protocol as specified by RFC 2002, which has a function for carrying out the mobile IP communication by regarding a network other than the home network to which the mobile computer 2 originally belongs as a home network (a function for borrowing a temporal home address from an arbitrary one of the prescribed mobile computer management servers), in addition to the functions required for the mobile node according to the mobile IP protocol. In addition, in this embodiment, a function for making a necessary setting regarding the network configuration information provided from the mobile computer management server 5 is also provided in the mobile computer 2.

Figure 2:
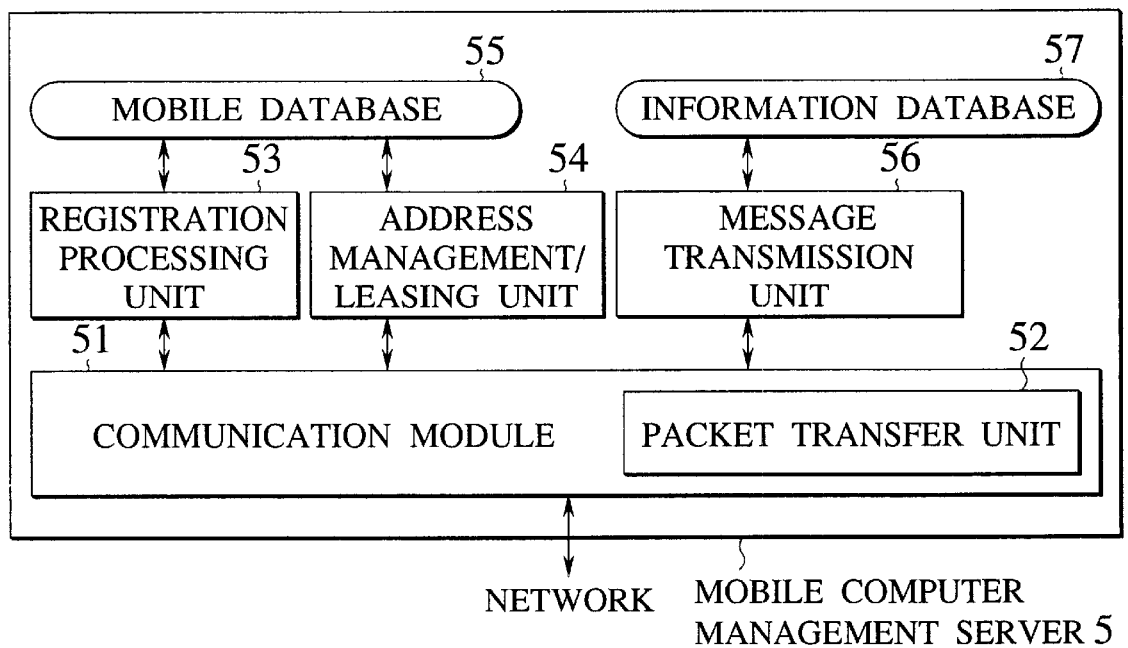
FIG. 2 is a block diagram showing an exemplary basic internal configuration of a mobile computer management server according to one embodiment of the present invention.

FIG. 2 shows an exemplary basic internal configuration of the mobile computer management server 5. As shown in FIG. 2, the mobile computer management server 5 of this embodiment includes a communication module 51, a packet transfer unit 52, a registration processing unit 53, an address management/leasing unit 54, a mobile database 55, a message transmission unit 56, and an information database 57.

The mobile computer management server 5 is implemented with the operations equivalent to those of the home agent of the mobile IP protocol as specified by RFC 2002, that is:

(1) a processing of a location registration message from the mobile computer (a registration processing unit 53); and (2) a processing for capturing a packet destined to the home address of the mobile computer on the home network, and transferring it by encapsulating it inside a packet destined to the current location of the mobile computer (the packet transfer unit 52).

Also, in this embodiment, in addition to the above described operations as a home agent, the mobile computer management server 5 is implemented with:

(3) a processing for managing a set of unused addresses for leasing within the network, and leasing one such address in response to an address leasing request from the mobile computer (where the mobile computer can be one that has moved into the own network or one that is connected to a nearby external network) (the address management/leasing unit 54); and (4) a processing for transmitting an answer message containing the network configuration information such as that of the proxy server or DNS server within the own network, in response to a query message from the mobile computer (the message transmission unit 56).

Note that the communication module 51 is a module for carrying out communications through networks, and the mobile database 56 is a memory for storing in correspondence a home address of the mobile computer, a Care-of-address of the moving mobile computer, and a flag indicating whether the moving mobile computer is one that has this network as a home network originally or one to which a home address is leased temporarily as a guest, as an information for registering the mobile computer for which the mobile IP communication is to be supported, while the information database 57 is a memory for storing the network configuration information. Here, it is assumed that a leasing address information regarding home addresses for leasing and their utilization states is stored in either the mobile database 55, or the information database 57, or a dedicated database (not shown).

As for a protocol to be used in the processing for requesting and leasing a temporal home address, a negotiation can be carried out using host-to-host unicast communications by extending messages (such as DHCPDISCOVER, DHCPOFFER, etc.) of the DHCP (Dynamic Host Configuration Protocol: see RFC 1541), for example.

Figure 3:
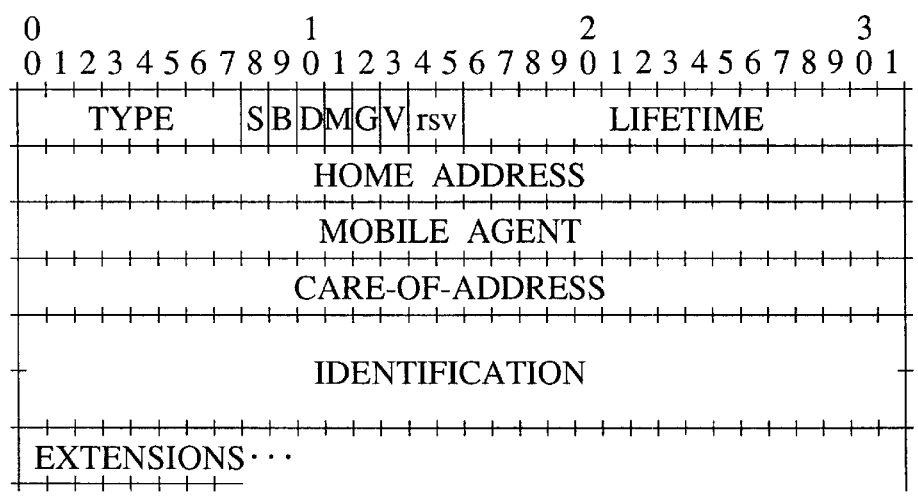
FIG. 3 is a diagram showing an exemplary format of a registration message used in one embodiment of the present invention.
Figure 4:
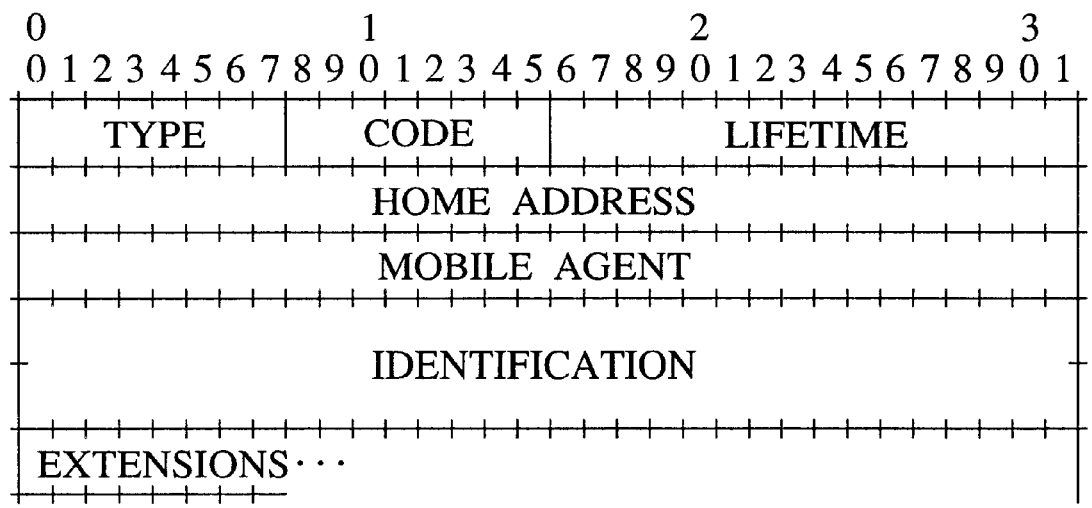
FIG. 4 is a diagram showing an exemplary format of a response message used in one embodiment of the present invention.

FIG. 3 shows an exemplary format of a registration message that is processed at the registration processing unit 53 of the mobile computer management server 5, and FIG. 4 shows an exemplary format of a response message that is transmitted by the registration processing unit 53 in response to the registration message. These formats are those defined in the mobile IP protocol specification (except that the mobile agent is used in place of the home agent).

Figure 5:
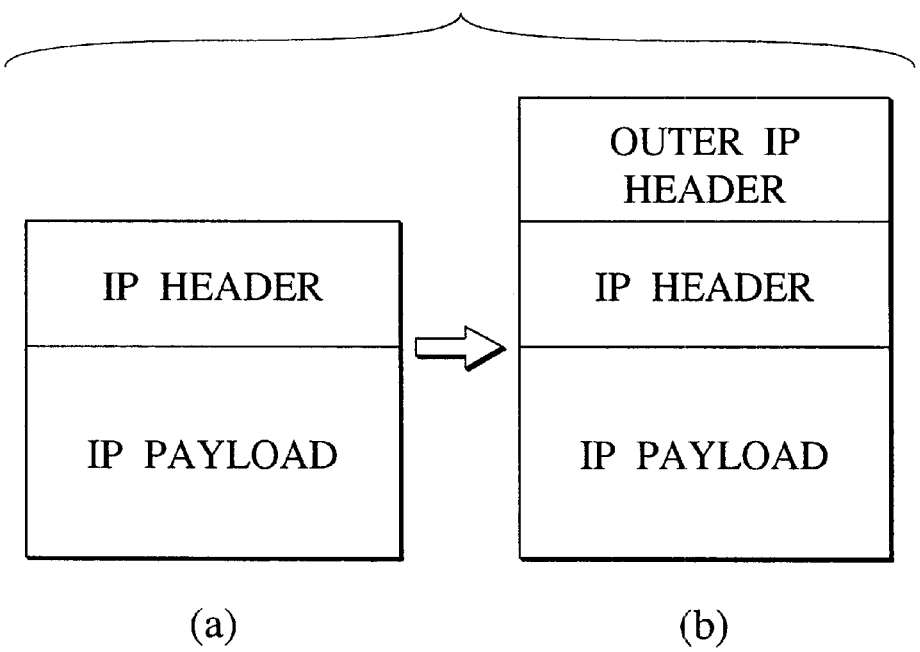
FIG. 5 is a diagram showing an exemplary format of an encapsulated packet used in one embodiment of the present invention.

FIG. 5 shows an exemplary format of an encapsulated packet that is processed at the packet transfer unit 52 of the mobile computer management server 5, where data destined to an original address (home address) of the mobile computer in the usual IP packet format as shown in a part (a) is encapsulated inside a packet destined to the registered current location address as in the mobile IP format shown in a part (b). This format is also that defined in the mobile IP (RFC 2003).

Now, one example of operations for the address leasing, the registration as a mobile node, and the release of a temporal address (the deletion of the registration as a mobile node) and a data management associated with these operations will be described.

Here, it is assumed that the database for the leasing address information stores in correspondence each home address for leasing and a flag indicating a utilization state of that home address as either used, unused, or after leasing but before registration.

When the address leasing request from a mobile computer located outside the own network is received, the address management/leasing unit 54 refers to the database for the leasing address information, and if there exits an unused home address for leasing, returns a response message containing a home address to be used by the request source mobile computer temporarily, and sets the flag of that address to the after leasing but before registration state. On the other hand, if there is no unused home address for leasing, the address management/leasing unit 54 returns an error message to the request source mobile computer.

When the registration message from the mobile computer to which the address is leased is received, the home address, the Care-of-address and the flag are registered in the mobile database 55, while the flag of the corresponding address in the leasing address information is set to the used state.

Note that the leased temporal address will eventually be released (returned), and a timing for this release can be a timing at which a message indicating the releasing of the temporal address (that is, the deletion of the registration as a mobile node) is transmitted from the mobile computer 2 to the mobile computer management server 5. Here, it may also be made possible to set a temporal address leasing period and use the elapsing of this temporal address leasing period also as a timing for the release as well. When the above described message is received from the mobile computer 2 to which the address is leased, the registration information (the home address, the Care-of-address and the flag) of that mobile computer is deleted from the mobile database 55, while the flag of the corresponding address in the leasing address information is set to the unused state.

Also, in anticipation of a case where an address is leased but this address is not used for the registration as a mobile node, it is preferable to reset the flag indicating the after leasing but before registration state into the unused state when no registration message comes after an elapse of a prescribed period time since the leasing of the address, for example.

Next, another example of operations for the address leasing, the registration as a mobile node, and the release of a temporal address (the deletion of the registration as a mobile node) and a data management associated with these operations will be described.

Here, it is assumed that the valid period (lifetime) of the leased address is to be determined. The valid period may be a fixed one, or may be set up at each occasion by also providing prescribed criteria. It is also assumed that the database for the leasing address information stores in correspondence each home address for leasing, a flag indicating a utilization state of that home address as either used or unused, and an information on the valid period for the home address that is in the used state.

When the address leasing request from a mobile computer located outside the own network is received, the address management/leasing unit 54 refers to the database for the leasing address information, and if there exists an unused home address for leasing, returns a response message containing a home address to be used by the request source mobile computer temporarily, and sets the flag of that address to the used state. On the other hand, if there is no unused home address for leasing, the address management/leasing unit 54 returns an error message to the request source mobile computer.

When the registration message from the mobile computer to which the address is leased is received, the home address, the Care-of-address and the flag are registered in the mobile database 65.

When the valid period of the leased temporal address expires, the registration information (the home address, the Care-of-address and the flag) of that mobile computer is deleted from the mobile database 55, while the flag of the corresponding address in the leasing address information is set to the unused state.

Note that when a re-registration of the address (the Keep Alive message as specified in the mobile IP) is received from the mobile computer 2 to which the address is leased, before the valid period of the leased temporal address expires, the valid period of the leased address is initialized to a value at a time of initial leasing.

Also, it is possible to adopt a scheme in which, when a message indicating the releasing of the temporal address (that is, the deletion of the registration as a mobile node) is received from the mobile computer 2 to which the address is leased, before the valid period of the leased temporal address expires, the registration information (the home address, the Care-of-address and the flag) of that mobile computer is also deleted from the mobile database 55, while the flag of the corresponding address in the leasing address information is set to the unused state.

Next, another form of the mobile computer management server 5 according to the present invention will be described.

The configuration shown in FIG. 2 is directed to a case where the mobile computer management server 5 is realized as a single device, but it is also possible to realize the mobile computer management server 5 as a combination of two devices a home agent (HA) as defined by the mobile IP and a mobile information management server (MM) for carrying out the processing other than that of the home agent.

Figure 6:
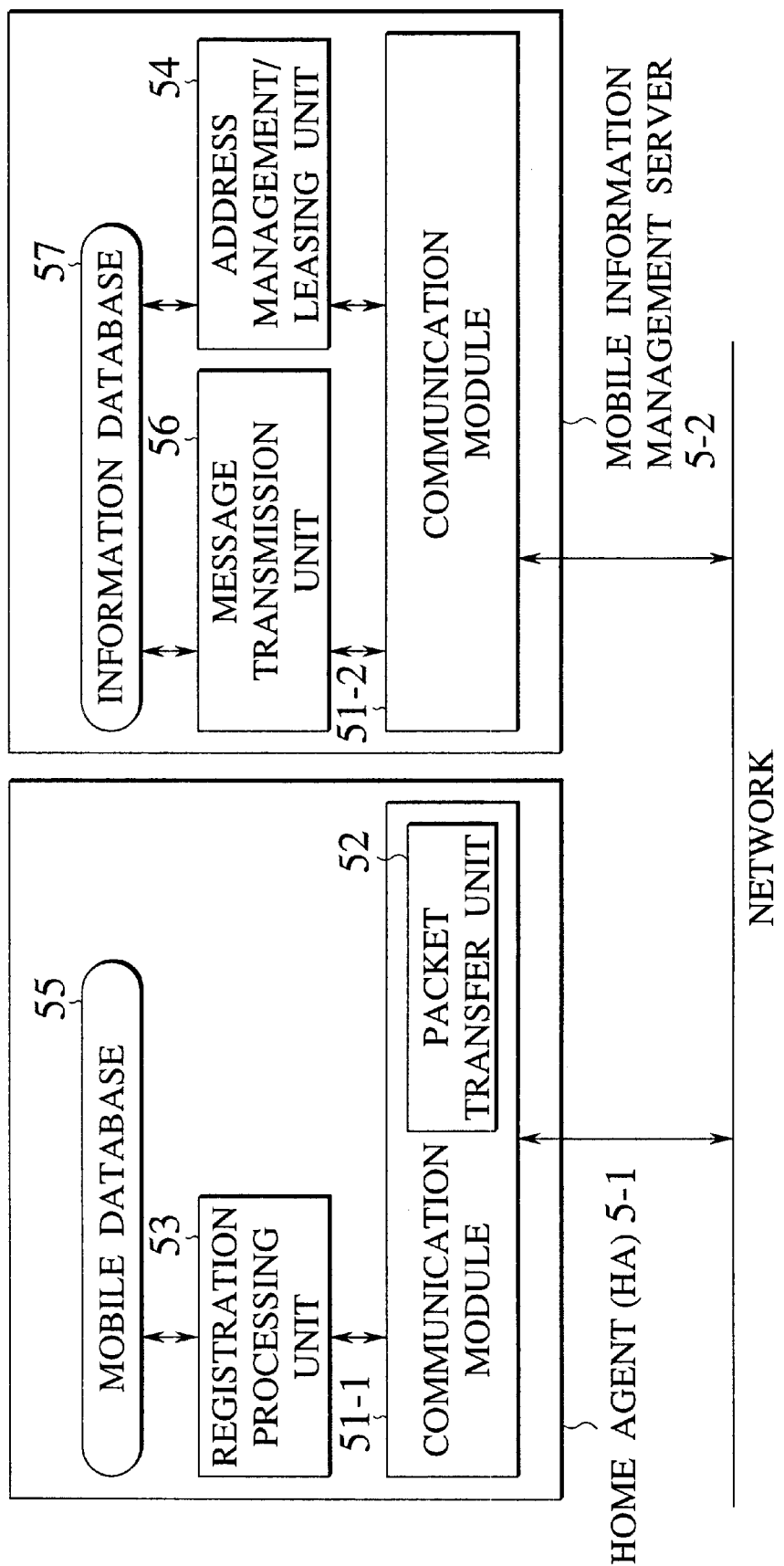

FIG. 6 shows an exemplary configuration in which the mobile computer management serve 5 is formed by a home agent 5-1 and a mobile information management server 5-2. As shown in FIG. 6, the home agent 5-1 includes the registration processing unit 53 for processing the moving registration message from the mobile computer 2, the packet transfer unit 52 for operating a packet desired to the home address of the mobile computer 2 on the home network and transferring it to the current location of the mobile computer 2, the mobile database 55, and a communication module 61-1, while the mobile information management server 5-2 includes the address management/leasing unit 54, the message transmission unit 56, the information database 57, and a communication module 51-2. Note that the packet transfer unit 52, the registration processing unit 53, the address management/leasing unit 54, the mobile database 55, the message transmission unit 56, and the information database 57 shown in FIG. 6 are the same as those shown in FIG. 2, and each of the communication module 51-1 and the communication module 51-2 shown in FIG. 6 is the same as the communication module 51 shown in FIG. 2. Here, it is assumed that the leasing address information regarding home addresses for leasing and their utilization states is stored in either the information database 57 inside the mobile information management server 5-2 or a dedicated database (not shown).

In this case, the mobile computer 2 can be given the address information for either one or both of the home agent 5-1 and the mobile information management server 5-2 and set to make an access to appropriate one of these devices corresponding to the necessary processing, or set to make an access through either one of these devices all the times. The home agent 5-1 and the mobile information management server 5-2 can be set to cooperate with each other according to the need.

In addition, in the above described case, the mobile information management server 5-2 may be divided into a section (leasing address management server) for carrying out the address management/leasing processing and a section (resource server) for carrying out the answer message transmission processing, and formed by two devices. In this case, the address management/leasing unit 54, the communication module 51-2 and the necessary database are incorporated into the former server, while the message transmission unit 58, the communication module 51-2 and the necessary database are incorporated into the latter server, for example.

Also, instead of providing the information database 57 inside the mobile computer management server 5 or the mobile information management server 5-2, it is also possible to adopt a configuration in which the necessary network configuration information is collected from one or plural other resource servers by the message transmission unit 56.

Also, the above description is directed to a case where the mobile computer 2 is assumed to transmit the query message to the selected mobile computer management server 5 or mobile information management server 5-2, but it is also possible to adopt a configuration in which one or a plurality of resource servers each having the message transmission unit 56, the information database 57 (the network configuration information database provided therein) and the communication module 51-2 are provided inside the network, and the mobile computer management server 5 or the mobile information management server 5-2 (which is sufficient to have the address management/leasing unit and a leasing address information database (a part of the information database 57)) notifies the address information and the like of the resource servers to the mobile computer 2 so that the mobile computer 2 sends the query message individually to one or the plurality of resource servers and makes the setting by integrating these answer messages returned from the plurality of resource servers.

Note also that, as still another configuration of the mobile computer management server 5, the mobile computer management server 5 may be divided into a server in which the address management/leasing function is added to the home agent 5-1 and a server which has the answer message transmission function, and formed by two devices.

Next, the exemplary configuration for the mobile computer to acquire the network configuration information in the case of using a separately provided resource server having a function for providing the network configuration information will be described.

Figure 20:
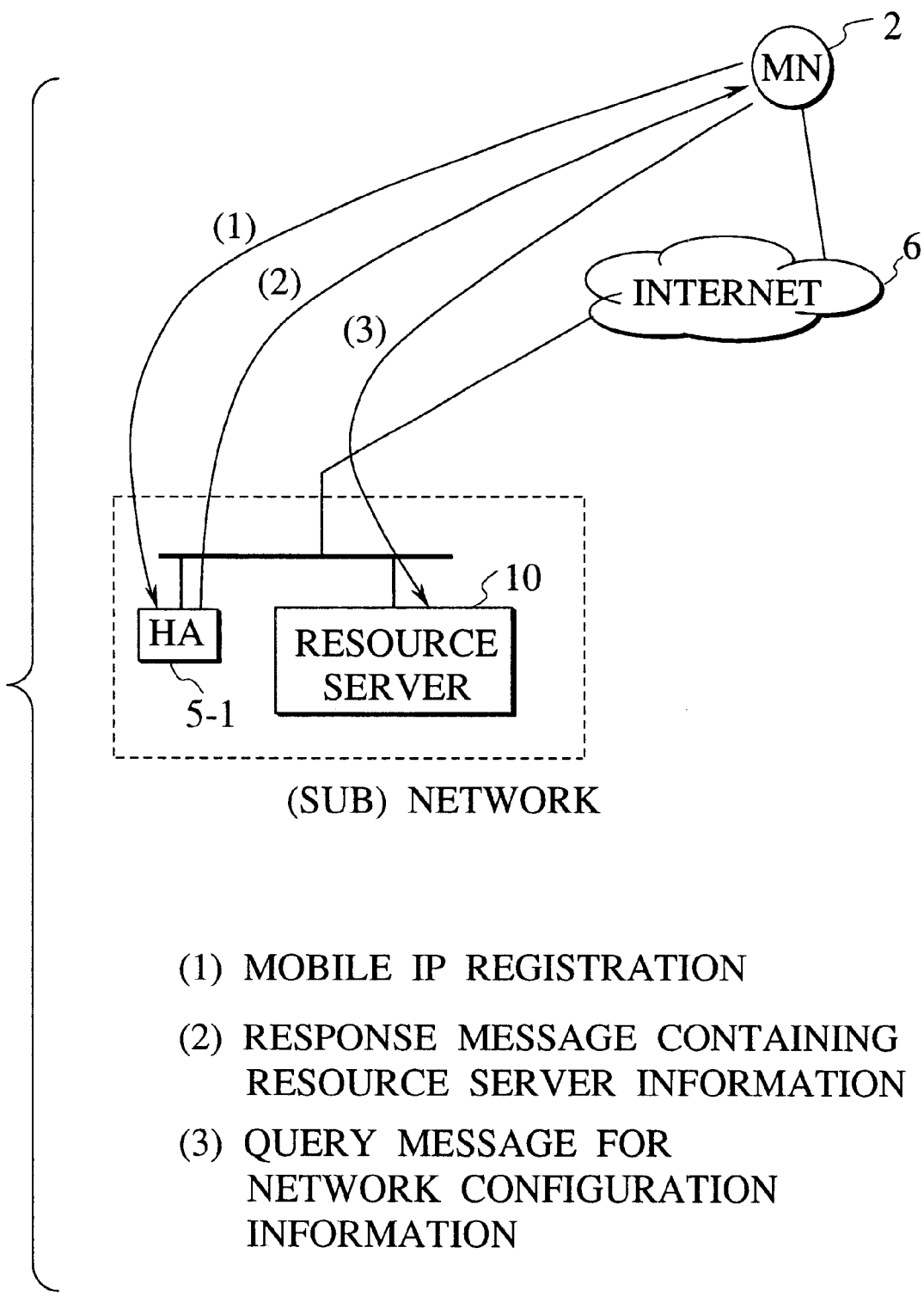
FIG. 20 is a schematic diagram showing one modified case for explaining the operation of a mobile computer according to one embodiment of the present invention.

First, the case where sections corresponding to the home agent and the resource server are arranged at different computers as shown in FIG. 20 will be described. Note that in this case, the leasing address management function may be implemented in the home agent 5-1, or in the resource server 10, or else as a separate leasing address management server.

Now, in such a case, it is possible to adopt a scheme in which the mobile computer 2 transmits the location registration message to the home agent 5-1 at a time of the initial location registration, and in response the home agent 5-1 returns a response message containing the address information of the resource server 10 (the resource server information) to the mobile computer 2. Then, upon receiving this response message, the mobile computer 2 newly transmits a query message based on the own protocol to the resource server 10, receives a response message for this query from the resource server 10, and carries out the setting of the necessary network configuration information.

In this scheme, the communication protocol with respect to the resource server can be set up freely, without being constrained by the extended Mobile IP protocol, so that there is an advantage in that it is possible to construct an inter-connectable system even with respect to an individual resource server.

Note that it is also possible to modify a part where the initial location registration of the mobile computer is carried out by using communications based on the Mobile IP with the mobile computer management server 5 or the home agent 5-1 and the network configuration information or the resource server information is acquired by utilizing this location registration procedure. For example, it is possible to adopt a configuration in which the mobile computer management server 5 or the home agent 5-1 is replaced by a leasing address management server and the resource server information is acquired by utilizing the procedure for acquiring the temporal address at the visited site network.

Figure 21:
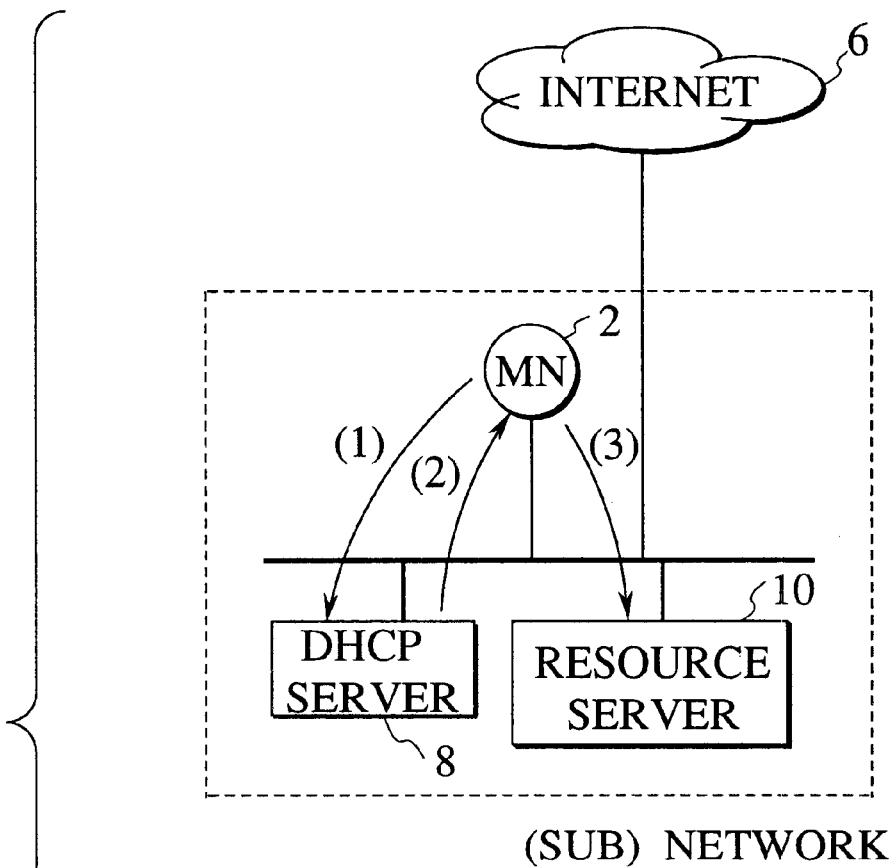
FIG. 21 is a schematic diagram showing another modified case for explaining the operation of a mobile computer according to one embodiment of the present invention.

Here, the case of case of using the DHCP server as the above described leasing address management server and providing the resource server separately as shown in FIG. 21 will be described. Note however, that a server based on a protocol other than DHCP such as PPP server may be used instead.

In such a case, it is possible to adopt a scheme in which, when the mobile computer 2 moved to a new location, the mobile computer 2 first transmits an address request message to the DHCP server 8 on that network. Upon receiving this message, the DHCP server 8 returns a response message that contains the address information of the resource server 10 (the resource server address) along with a temporal address to be used by the mobile computer 2. Then, upon receiving this message, the mobile computer 2 newly transmits a query message based on the own protocol to the resource server 10, receives a response message for this query, and carries out the setting of the necessary information.

In this scheme, the resource server information is associated not with the message exchange by the Mobile IP but with the message exchange by the DHCP, etc., so that it is more pragmatic to adopt this scheme in a system where the message exchange with the resource server and the setting of the resource server information are to be given a higher priority than the Mobile IP control. Also, this scheme can be carried out independently from the Mobile IP so that it is applicable even to a general network which does not adopt the Mobile IP.

Namely, in this scheme, it is not absolutely necessary to carry out the Mobile IP communication, and at a time of having an address temporarily allocated at a visited site subnet, it is possible to automatically collect the necessary information such as the network configuration information and automatically carry out the setting to the communication program.

Note that the DHCP supports only communications with respect to subnet, so that in a situation where not necessarily all DHCP servers are supporting the function for returning the resource server information, it is difficult to acquire the resource server information from the DHCP server by this scheme if the DHCP server on the subnet to which the mobile computer 2 moved happened to be not supporting the function for returning the resource server information. In this regard, in a system where the home agent of the Mobile IP returns the resource server information, it is possible to use a protocol different from the subnet broadcast, so that there is a flexibility in that it is possible to select a home agent that is supporting the function for returning the resource server information by searching through home agents on nearby networks rather than using just the home agent on the visited site network, even in a situation where not necessarily all home agents are supporting the function for returning the resource server information.

Moreover, when the mobile computer 2 failed to acquire the resource server information from the DHCP server of the visited site subnet, for example, it is also possible to activate a program for Mobile IP communication, and acquire the resource server information through the Mobile IP registration processing with respect to a home agent on a nearby network, using an address allocated from the DHCP server as a Care-of-address and an address leased from the nearby network as a home address.

In the following, the configuration and the processing procedure of the mobile computer 2 will be described. The following description will be mainly directed to those corresponding to the mobile computer management server 5 having an exemplary configuration as shown in FIG. 2, but even in the case where the mobile computer management server 5 is divided into a plurality of servers and there is a need for the mobile computer 2 to voluntarily exchange data with all or some of these plurality of servers, the following description basically applies similarly, except for an additional procedure by which the resource server information is obtained as a response to the registration message or the address request message, for example.

Figure 7:
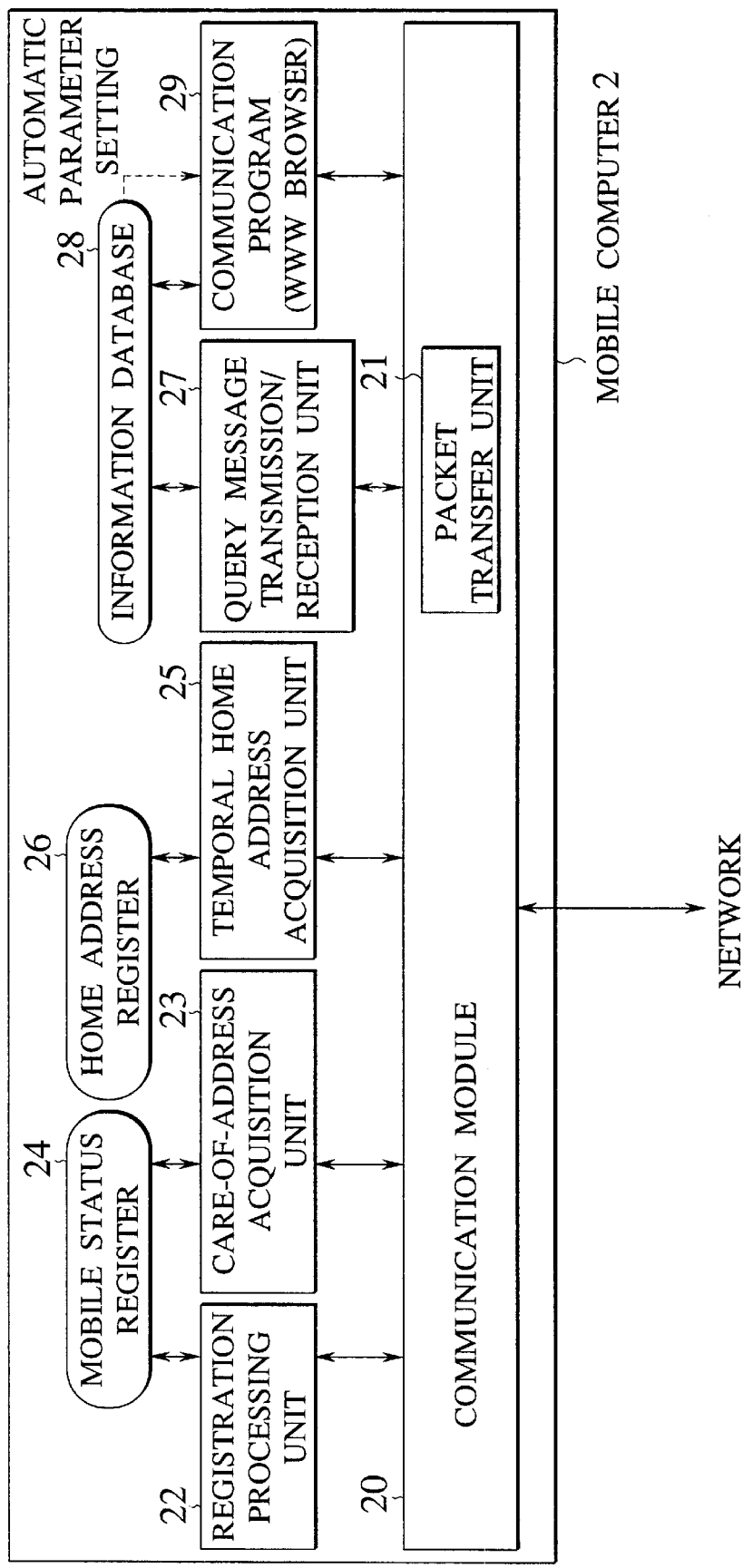
FIG. 7 is a block diagram showing an exemplary basic internal configuration of a mobile computer according to one embodiment of the present invention.

Now, FIG. 7 shows an exemplary basic internal configuration of the mobile computer 2. As shown in FIG. 7, the mobile computer 2 of this embodiment includes a communication module 20, a packet transfer unit 21, a registration processing unit 22, a Care-of-address acquisition unit 23, a mobile status register 24, a temporal home address acquisition unit 25, a home address register 26, a query message transmission/reception unit 27, and an information database 28. Also, the mobile computer 2 is made such that a communication program 20 such as WWW browser for example is operable thereon.

The mobile computer 2 carries out the operations equivalent to those of a mobile node (Co-located Care-of-address) of the mobile IP protocol as specified by RFC 2002, that is:

(1) an acquisition of the Care-of-address at the visited location (the Care-of-address acquisition unit 23) and a transmission of the location registration message (the registration processing unit 22): and (2) a processing of an encapsulated packet transferred from the mobile computer management server 5 (the packet transfer unit 21).

Here, it is assumed that the Care-of-address is automatically assigned either by the PPP (Point to Point Protocol: RFC 1661) from the ISP (Internet Service Provider) or by the DHCP from the visited site network.

Note that the communication module 20 is a module for carrying out communications through networks, and the mobile status register 24 is a register for storing a flag indicating whether the mobile computer 2 is moving or not, the acquired Care-of-address, an identification information of the mobile computer management server which is currently an agent for the mobile computer 2, and an information regarding a moving state such as whether the mobile computer 2 is connected to a network or connected as an external node for example in the case of moving, while the home address register 28 is a register for storing the acquired temporal home address, and the information database 28 is a memory for storing the acquired network configuration information.

It is also assumed that the mobile computer 2 stores therein an address information of the mobile computer management server of the original home network, and an address information of the mobile computer management servers of the other networks that can be regarded as a home network. In addition, the network configuration information of the original home network may also be stored.

Also, in addition to the above described operations equivalent to those of a mobile node (Co-located Care-of-address) of the mobile IP protocol as specified by RFC 2002, the mobile computer 2 of this embodiment is capable of carrying out an operation of becoming a mobile node to carry out the mobile IP communication by selecting arbitrary one from a plurality of prescribed networks other than the original home network and regarding it as a home network. To this end, the mobile computer 2 carries out the mobile IP communication by using a temporal home address for guest at the selected home network. The home address for guest is temporally borrowed by transmitting the address leasing request message to the mobile computer management server 5 from the temporal home address acquisition unit 25 at a time of setting up a communication. As already mentioned above, as for a protocol to be used in the processing between the address management/leading unit 54 of the mobile computer management server 5 and the temporal home address acquisition unit 25 of the mobile computer 2, a negotiation can be carried out using host-to-host unicast communications by extending the DHCP messages (such as DHCPDISCOVER, DHCPOFFER, etc.), for example.

It is also possible to adopt a configuration such that, in the case where some mobile computer moves to a prescribed network or any one of prescribed networks, that mobile computer can use a pre-registered address as a home address for quest. In this case, for example, the mobile computer 2 stores therein an identification information of a visited site network (or its mobile computer management server 5) and the home address for guest in correspondence, while the mobile database 55 of the mobile computer management server 5 stores therein a host ID of the mobile computer 2 and the home address for guest in correspondence, and at a time of moving, it is made possible to use the reserved home address for guest by checking the host ID between the mobile computer 2 and the mobile computer management server 5.

The temporal home address so acquired is stored in the home address register 26, and the communication module 20 of the mobile computer 2 is set to be connected to this temporal home address.

Figure 8:
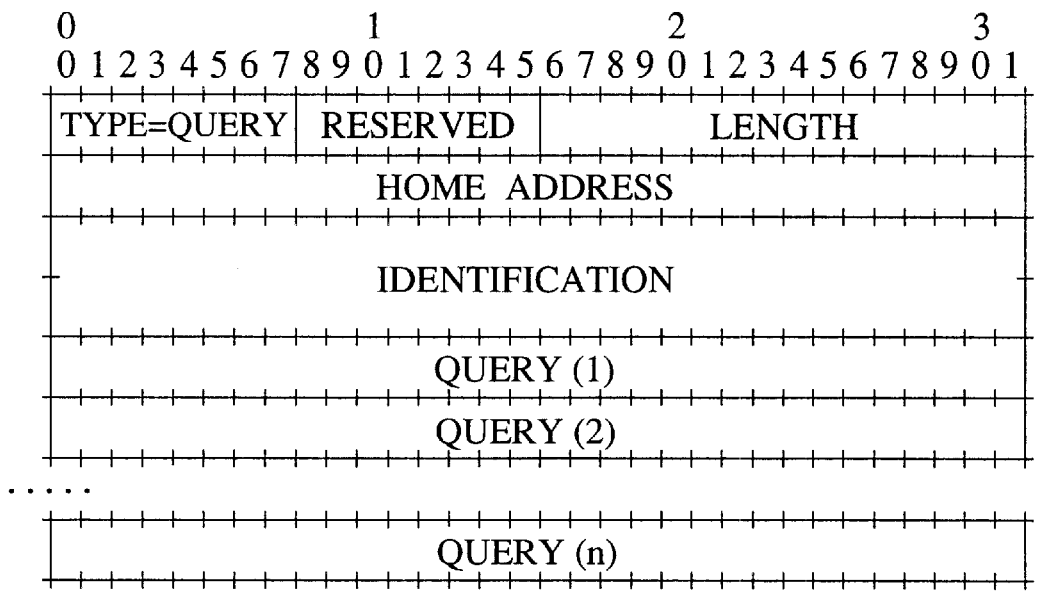
FIG. 8 is a block diagram showing an exemplary configuration of a mobile computer management server and a mobile information management server according to one embodiment of the present invention.
Figure 9:
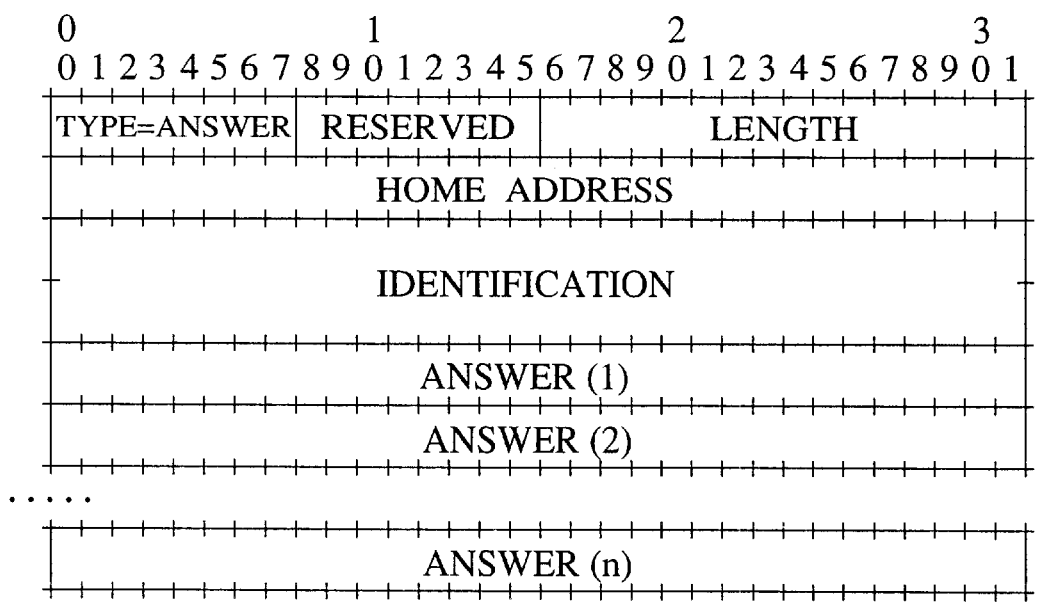
FIG. 9 is a diagram showing an exemplary format of an answer message used in one embodiment of the present invention.

Also, in this embodiment, the mobile computer 2 is made to support a function for automatically setting the network information to the communication program 29 such as WWW browser for example, which is to be operated thereon. For example, the mobile computer 2 transmits a query message as shown in FIG. 8 from the query message transmission/reception unit 27 to the selected mobile computer management server 5, receives an answer message as shown in FIG. 9 from the mobile computer management server 5, and notifies the network configuration information of a network to which the mobile computer management server 5 is connected that is contained in this answer message, to the communication program 29 such as WWW browser using appropriate means.

As a method for this notification, various options are available, including a method in which the network configuration information is stored as a file and the communication program is made to read this file at a time of activation, a method in which a process for carrying out the notification exchanges necessary information by carrying out inter-process communications with the communication program, and a method in which the query message transmission/reception unit 27 is formed inside the communication program 29 and the necessary information is acquired and set by operating the query message transmission/reception unit 27 at a time of activation of the communication program 29, for example. It is also possible to set the acquired network configuration information to an information storage position that indicates the network setting for all the communication programs which are operating on this mobile computer 2.

As for content of the network configuration information to be acquired by the query message, various choices can be considered. For example, it can be a site local information such as the proxy server address or the DNS server address. Besides that, it can also be a host dependent information (such as an authentication code key for each host), a user dependent information (such as a certificate for electronic commerce), and/or a specific application dependent information (such as an encryption key of the browser), of the mobile computer. In this case, the necessary information is acquired by transmitting a query message to which the necessary host, user, and application information is attached.

Next, the operation of the mobile computer 2 of this embodiment for each moving state will be described in detail.

Here, the moving states includes cases according to the mobile IP protocol as specified by RFC 2002, that is:

(1) a case in which the mobile computer 2 is located inside the original home network and inside the same subnet as the mobile computer management server of that home network;

(2) a case in which the mobile computer 2 moves to another subnet inside the original home network, and carries out the mobile IP communication using the mobile computer management server of that home network;

(3) a case in which the mobile computer 2 moves to a visited site network outside the original home network, and carries out the mobile IP communication using the mobile computer management server of that original home network; and (4) a case in which the mobile computer 2 moves outside the original home network and is connected to the Internet as an external node, and carries out the mobile IP communication using the mobile computer management server of that original home network.

In these cases the operations of the home agent and the mobile computer are the same as the conventional ones so that their description will be omitted here.

Apart from these, in this embodiment, the moving states also includes:

(A-1) a case in which the mobile computer 2 is located inside the same subnet as the mobile computer management server of the visited site network;

(A-2) a case in which the mobile computer 2 moves to a visited site network outside the original home network and is located inside a subnet different from that of the mobile computer management server of the visited site network, and carries out the mobile IP communication using that mobile computer management server of the visited site network; and (B) a case in which the mobile computer 2 is connected to the Internet as an external node, and carries out the mobile IP communication using a mobile computer management server of a nearby (or selected) network.

First, the operation in the case (A-1) will be described.

Figure 10:
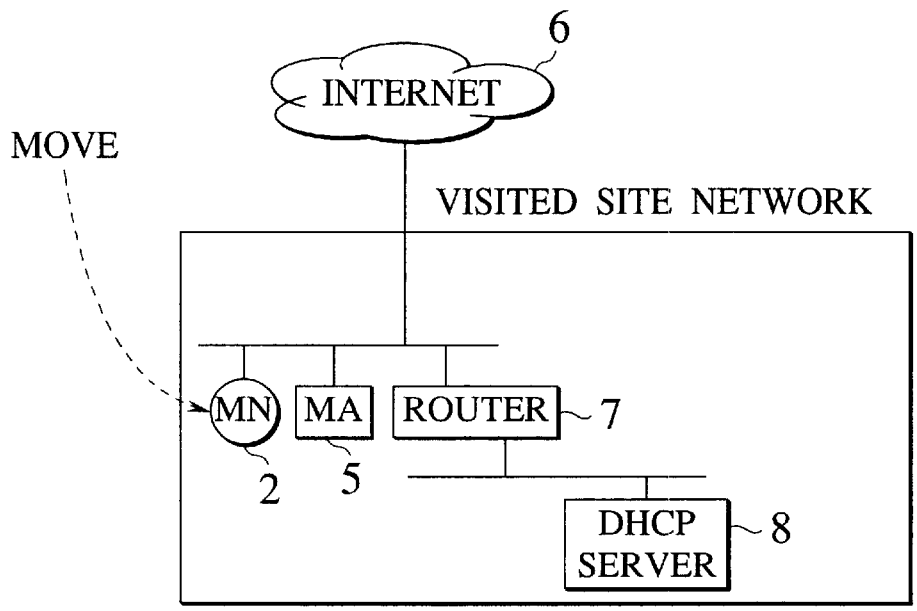
FIG. 10 is a schematic diagram showing one exemplary case (case A-1) for explaining the operation of a mobile computer according to one embodiment of the present invention.

As shown in FIG. 10, when the mobile computer 2 is connected to the same subnet as the mobile computer management server 5 of the visited site network, there is no need to use the mobile IP and the communication can be realized simply by the processing similar to that in the case of acquiring an address using the DHCP or the like.

Consequently, in this case, when the Care-of-address is acquired using the DHCP or the like and it is recognized that this mobile computer is connected to the same subnet as the mobile computer management server 5 using a prescribed method, the mobile computer sends the query message to the mobile computer management server 5, and upon receiving the answer message, sets the network configuration information contained in the answer message. Here, the fact that this mobile computer is connected to the same subnet as the mobile computer management server 5 can be recognized from the fact that the Care-of-Address and the network address portion of the IP address of the mobile computer management server 5 coincide, or from the fact of receiving an agent advertisement message that is regularly broadcasted within the subnet from the mobile computer management server 5, for example. In the latter case, it is possible to ascertain the fact that this mobile computer is connected to the same subnet as the mobile computer management server 5 even before acquiring the Care-of-address.

Next, the operation in the case (A-2) will be described.

Figure 11:
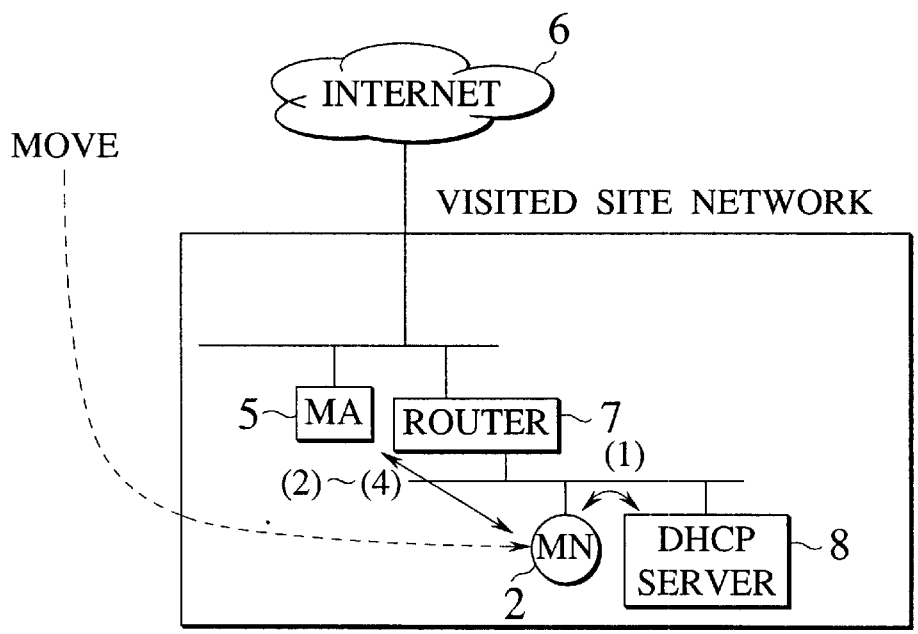
FIG. 11 is a schematic diagram showing another exemplary case (case A-2) for explaining the operation of a mobile computer according to one embodiment of the present invention.

As shown in FIG. 11, when the mobile computer 2 is located inside the visited site network and is connected to a subnet (a subnet that can be reached through a router 7 in FIG. 11) different from that of the mobile computer management server 5 of that visited site network, there is a need for data transfer over subnets, so that the mobile IP communication using the mobile computer management server 5 of the visited site network as a home agent is carried out.

In this case, the Care-of-address is acquired from a DHCP server 8 according to the DHCP first, for example, and when it is recognized that this mobile computer is not connected to the same subnet as the mobile computer management server 5 by utilizing the IP address or the agent advertisement message as described above, the address leasing request is sent to the mobile computer management server 5 so as to try to acquire the temporal address.

When the temporal address is successfully acquired, the registration message of the mobile IP is sent to the mobile computer management server 5, and the initial set up of the mobile IP is made.

When the registration message is accepted, the query message for the network configuration information of this visited site network is sent to the mobile computer management server 5 next, and upon receiving the answer message, the network configuration information contained in the answer message is set to the communication program 29 on the mobile computer 2.

Figure 12:
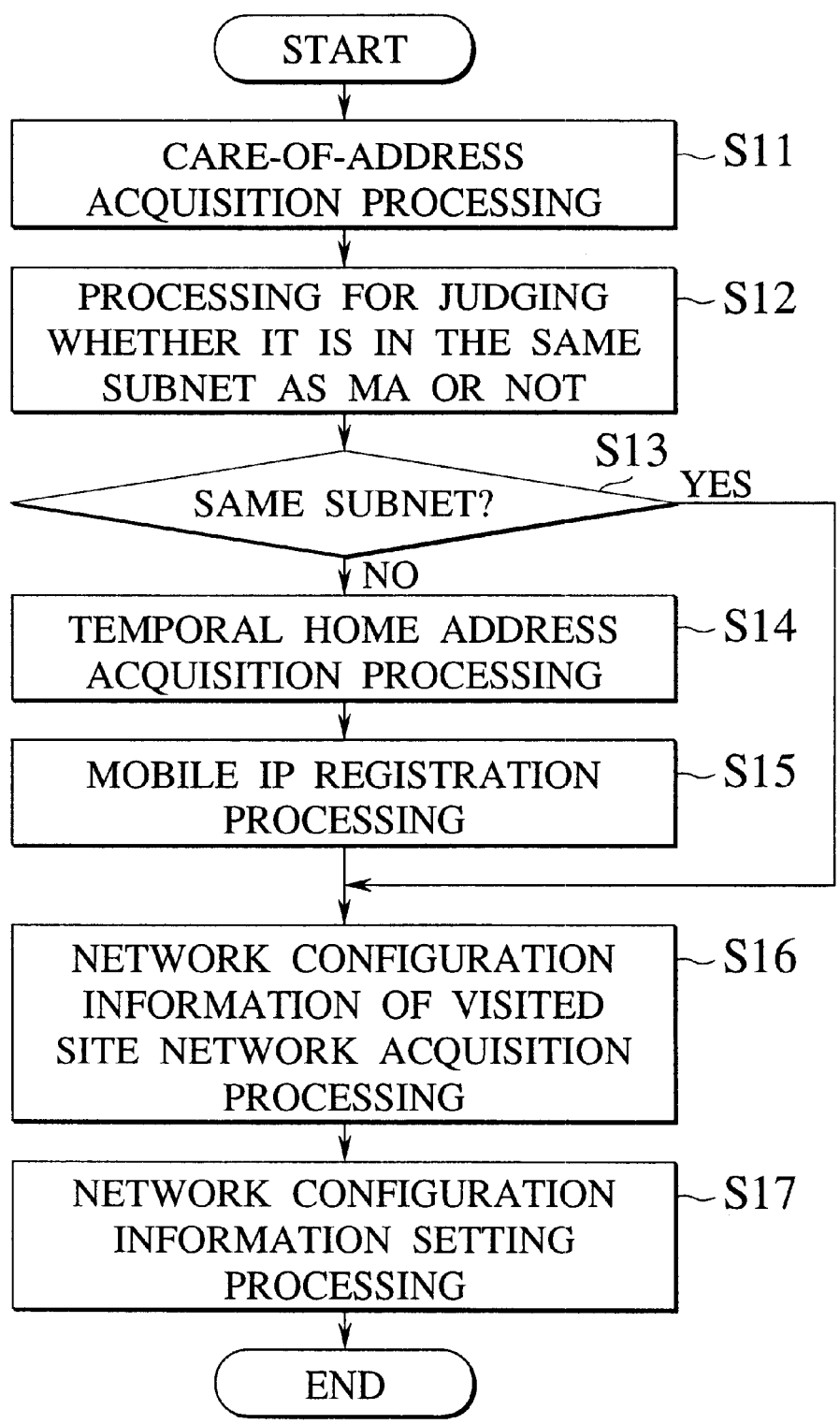
FIG. 12 is a flow chart of an exemplary operation procedure for a mobile computer applicable to the cases shown in FIG. 10 and FIG. 11.

An exemplary procedure applicable to both cases (A-1) and (A-2) is shown in FIG. 12, which proceeds as follows.

First, the Care-of-address acquisition processing is carried out (step S11), and then the processing for judging whether the mobile computer is in the same subnet as the mobile computer management server or not is carried out (step S12). If it is in the same subnet (S13 YES), the procedure proceeds to the step S16. Otherwise the temporal home address acquisition processing is carried out (step S14) and then the mobile IP registration processing is carried out (step S15). Then, the processing for acquiring the network configuration information of the visited site network is carried out (step S16) and finally the processing for setting the network configuration information is carried out (step S17).

Note that, in the case (A-1) described above, the mobile computer carries out communications by using the Care-of-address acquired at the visited site network, but instead of that, it is also possible to acquire the temporal home address at the temporal home address acquisition unit 25 and use it in carrying out communications.

Also, in the case (A-2) described above, the registration message and the query message are transmitted separately, but it is also possible to include the description of the query message in an extension field of the registration message in order to reduce traffics on the network.

In addition, at a time of transmitting the response message (in response to the registration message) from the mobile computer management server 5 to the mobile computer 2, it is possible to include the answer message (in response to the query message) in the response message and transmit this response message.

Figure 13:
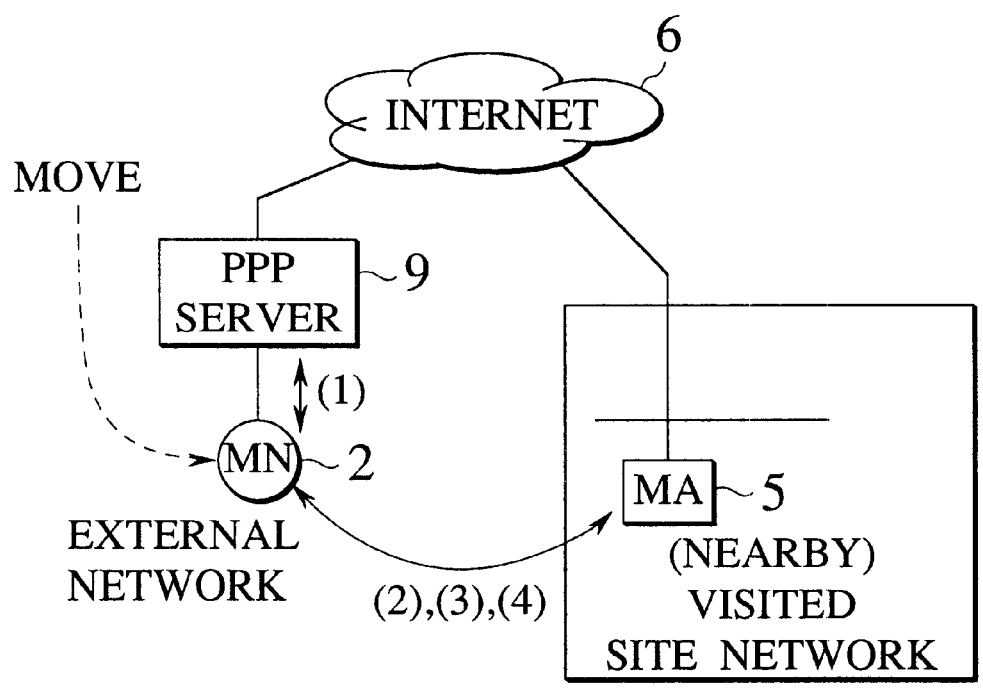
FIG. 13 is a schematic diagram showing still another exemplary case (case B) for explaining the operation of a mobile computer according to one embodiment of the present invention.

Next, the operation in the case (B) will be described. Here, the exemplary case where the mobile computer 2 carries out communications by being connected to an external network without entering into a specific visited site network as shown in FIG. 13 will be described.

In this case, the Care-of-Address is acquired from a PPP server 9 using PPP first, for example, and the address leasing request is transmitted to the mobile computer management server 5 of the nearby (or selected) visited site network so as to try to acquire the temporal address. When the request is accepted, the response describing the leased temporal home address is returned.

When the temporal address is successful acquired, the setting of the network software is renewed using the temporal home address contained in the response, and then the registration message of the mobile IP is sent to the mobile computer management server 5.

When the registration message is accepted, the query message for the network configuration information of this visited site network is sent to the mobile computer management server 5 next, and upon receiving the answer message, the network configuration information contained in the answer message is set to the communication program 29 on the mobile computer 2.

An exemplary procedure applicable to this case (B) is shown in FIG. 14, which proceeds as follows.

First, the Care-of-address acquisition processing is carried out (step S21), and then the temporal home address acquisition processing is carried out (step S22). Then, the mobile IP registration processing is carried out (step S23), and then the processing for acquiring the network configuration information of the visited site network is carried out (step S24). Finally, the processing for setting the network configuration information is carried out (step S26).

Note that, similar as in the previously described cases, it is also possible to merge the registration message and the query message by using an extension field of the registration message for the sake of the query message. Also, similarly as in the previously described cases, at a time of transmitting the response message (in response to the registration message) form the mobile computer management server 5 to the mobile computer 2, it is possible to include the answer message (in response to the query message) in the response message and transmit this response message.

Now, in the case where the mobile computer 2 is connected to the external network and makes the communication set up by selecting one mobile computer management server 5 as in the case (B) described above, there is a problem concerning how the mobile computer management server 5 should be selected.

One possible method for doing this selection is a method for appropriately selecting one that is supposed to be located nearby or one that appears to have a good response empirically. For example, in the case of an intranet environment within a company and the like, addresses of the mobile computer management servers 5 that are provided at plural spots are registered in the mobile computer 2 in advance, and a user utilize them by appropriately selecting one of them. Note that his processing is to be carried out either before or after the processing of the step S21 in the procedure of FIG. 14.

Note however that, in order to use the mobile computer environment of this embodiment comfortably, it is preferable to select the mobile computer management server 5 for which traffic between the mobile computer 2 and the mobile computer management server 5 is not jamming, and it is not necessarily appropriate to select the mobile computer management server 5 according to a physical distance or a network distance.

Another possible method for doing the aforementioned selection is a method for transmitting a challenge packet (a selection request packet) from the mobile computer 2 to a plurality of mobile computer management servers 5, and selecting an appropriate mobile computer management server 5 according to the response state (a time required since the transmission of the challenge packet until the arrival of the response packet, for example). An exemplary case of this method is illustrated in FIG. 15. Here, an arbitrary packet can be used as a challenge packet. For example "ping" of the TCP/IP can be utilized for this purpose directly. Also, the transmission with respect to a plurality of mobile computer management server 5 can be realized either by multicast or by successive unicast. When the mobile computer management server 5 to be used is decided as a result of this selection, the mobile communication environment is set up according to the sequence indicated in FIG. 13.

Note that the mobile computer 2 may transmit a decided selection packet to the selected mobile computer management server 5. In such a case, an explicit decided selection packet may be transmitted, or the address leasing request may play a double role as the decided selection packet as well (that is, the address leasing request is to be construed as the decided selection packet). In this case, upon receiving the challenge packet from the mobile computer 2, the mobile computer management server 5 returns the response packet immediately, and when the decided selection packet is returned in response to this, a transition to the normal operation of the mobile computer management server for this mobile computer is made. This automatic selection processing is to be carried out between the steps S21 and S22 in the procedure of FIG. 14.

Note that, depending on circumstances, it may be necessary to activate this mobile computer management server selection sequence again so as to make the communication setting again by selecting another mobile computer management server 5. However, even in the mobile environment in which the communication state unstably changes due to this, it is always possible to carry out communications by selecting the most appropriate mobile computer management server 5 so that it is possible to realize the comfortable mobile communication.

Still another method for doing the aforementioned selection is a method for selecting one that is located in a network which has the similar network environment as the original home network of the mobile computer 2.

It is also possible to use the mobile computer management server selection method in which some of the above described methods are combined.

As described, according to this embodiment, it becomes possible for the mobile computer to exchange messages with the mobile computer management server located in the visited site network or a network nearby the visited site, and construct the mobile IP communication environment by regarding that network as a home network.

Also, in the case of using the communication program such as browser while moving over networks, conventionally, it has been necessary to make various environmental information setting apart from the acquisition of an IP address at the visited site so that it has been very inconvenient especially for an end-user who has no knowledge regarding networks. In contrast, according to this embodiment, the mobile computer actively exchanges messages with a mobile computer management server located in a network nearby the visited site, receives information such as IP address and network resources that are necessary in order to operate as a guest user in that network, and sets this information automatically into the program such as browser, so that it becomes possible to construct the mobile IP communication environment by automatically regarding that nearby network as a home network.

Also, the messages to be exchanged with the mobile computer management server in the nearby network can be flexibly extended according to the system requirement, and it is also possible to exchange even an information regarding server resources such as proxy server and the DNS server of that nearby network, a user dependent information such as a security certificate corresponding to a user who uses that mobile computer, and a host dependent information corresponding to the host computer, and it is possible to automatically set all these information at the mobile computer side, so that there is no need to specify an information to be set to the program even when a user who has no knowledge regarding networks moves to the visited site environment and therefore it is possible to provide the mobile computer in which the setting of operation environment can be made very easily.

Also, according to this embodiment, unlike the conventional mobile IP scheme, the nearby network is detected according to the visited site of the mobile computer and the communication environment regarding that nearby network as a home network is constructed, so that even when the mobile computer moves far away from its original home network, there is no need to exchange packets via the original home network and therefore it is possible to construct the efficient mobile communication environment.

Also, the mobile computer can be provided with both a function for carrying out the mobile IP communication by regarding the visited site or nearby network as a home network and a function for carrying out the conventional mobile IP communication, so that either the mobile IP communication via the original home network or the mobile IP communication by regarding the visited site or nearby network as a home network can be selected at the visited site.

Now, there are several variations as to what functions regarding the mobile IP are to be provided to the mobile computer 2, and some exemplary case will be described in the following.

EXAMPLE 1

In this example, the mobile computer 2 has the original home network, and is provided with a function for carrying out the usual mobile IP with respect to the original home network, and a function for carrying out the mobile IP communication by regarding the visited site or nearby network as a home network at the visited site outside the original home network. Namely, in this mobile computer 2, in the case of moving outside the original home network, either the usual mobile IP communication with respect to the original home network or the mobile IP communication by regarding the visited site or nearby network as a home network can be selected at the visited site. In addition, this mobile computer 2 is made such that the mobile computer management server is selected automatically in the case of moving outside the original home network and carrying out the mobile IP communication by regarding the visited site or nearby network as a home network.

An exemplary operation procedure of the mobile computer 22 in this example is shown in FIG. 16, which proceeds as follows. Here, the overall control of this procedure is to be carried out by a controller (not shown) provided in the mobile computer 2.

First, according to the setting made by the user, an information as to whether the processing for the mobile IP using the mobile computer management server of the original home network (referred hereafter as a home mode) or the processing for the mobile IP using the other mobile computer management server (referred hereafter as a guest mode) is to be carried out is obtained (step S31).

When the home mode is specified (step S32 YES), the processing for the mobile IP using the mobile computer management server of the original home network is carried out (step 43). Namely, according to the mobile IP protocol as specified by RFC 2002, the mobile computer 2 carries out the appropriate processing depending on whether it is: (1) a case in which the mobile computer 2 is located inside the original home network and inside the same subnet as the mobile computer management server of that home network; (2) a case in which the mobile computer 2 moves to another subnet inside the original home network, and carries out the mobile IP communication using the mobile computer management server of that home network; (3) a case in which the mobile computer 2 moves to a visited site network outside the original home network, and carries out the mobile IP communication using the mobile computer management server of that original home network; or (4) a case in which the mobile computer 2 moves outside the original home network and is connected to the Internet as an external node, and carries out the mobile IP communication using the mobile computer management server of that original home network. In this case, the operations of the home agent and the mobile computer are the same as the conventional ones so that their description will be omitted here.

On the other hand, when the guest mode is specified (step S32), the following procedure is carried out.

First, according to the setting made by the user, an information as to whether it is a connection to the visited site network or a connection as an external node is obtained (step S33). Then, the Care-of-address is acquired by the method suitable for the connection form as described above (step S34).

Next, the mobile computer management server is selected (step S35). Here, in the case of the connection to the visited site network, the correspondence between a range of Care-of-address and a corresponding mobile computer management server is stored in advance, and the mobile computer management server in the visited site network is determined according to the acquired Care-of-address, for example. In the case of the connection as an external node, the mobile computer management server in the nearby network is determined by the method using the challenge packet as described above, for example.

In addition, in the case of the connection to the visited site network (step S36), whether the mobile computer is in the same subnet as the mobile computer management server or not is judged (step S37). This judgement is made by checking whether network address indicating portions of the Care-of-address and the address of the mobile computer management server coincide with each other or not.

Then, in the case where the mobile computer is connected to a subnet different from the mobile computer management server in the visited site network (step S38 NO) and in the case of the connection as an external node (step S36 YES), the temporal home address is acquired from the mobile computer management server as described above (step S39), and the processing for the mobile IP registration is carried out by transmitting the registration message of the mobile IP as described above (step S40).

On the other hand, in the case where the mobile computer is connected to the same subnet as the mobile computer management server in the visited site network (step S36 YES), the steps S39 and S40 are skipped.

Next, the network configuration information of the visited site or nearby network that is to be regarded as a home network by the mobile computer is acquired from the mobile computer management server as described above (step S41), and the necessary setting of the acquired network configuration information is made as described above (step S42).

(Variation 1)

The procedure for the mobile computer of the example 1 described above can be modified such that, in the case of the connection as an external node, the user selects the nearby network so that a corresponding mobile computer management server is set.

For example, at appropriate timing, a list of names of networks that are connectable in the quest mode is displayed on a window for user setting as shown in FIG. 17, and the user enters a selection of the desired network. Here, in the display screen of FIG. 17, the help function can be provided so as to display a list of names of networks that can be regarded as a home network and the geographic information on their locations, as well as the information on their network environments if necessary, for reference at a time of the selection by the user.

It is also possible to modify this procedure such that the user can select either the automatic setting or the manual setting.

(Variation 2)

The procedure of the example 1 or the variation 1 described above can be modified such that, in the case of the connection to the visited site network, the user selects the visited site network so that a corresponding mobile computer management server is set.

For example, at appropriate timing, a list of names of networks that are connectable in the guest mode is displayed on a window for user setting as shown in FIG. 17, and the user enters the connected visited site network.

It is also possible to modify this procedure such that the user can select either the automatic setting or the manual setting.

EXAMPLE 2

In this example, the mobile computer 2 does not have the original home network, and is provided with a function for carrying out the mobile IP communication by regarding the visited site network in the case of connection to the visited site network or the nearby network in the case of the connection as an external node as a home network at the visited site. Namely, this mobile computer 2 is that in which the function for carrying out the usual mobile IP communication with respect to the original home network is removed from the mobile computer 2 of the example 1, variation 1, or variation 2 described above.

Figure 18:
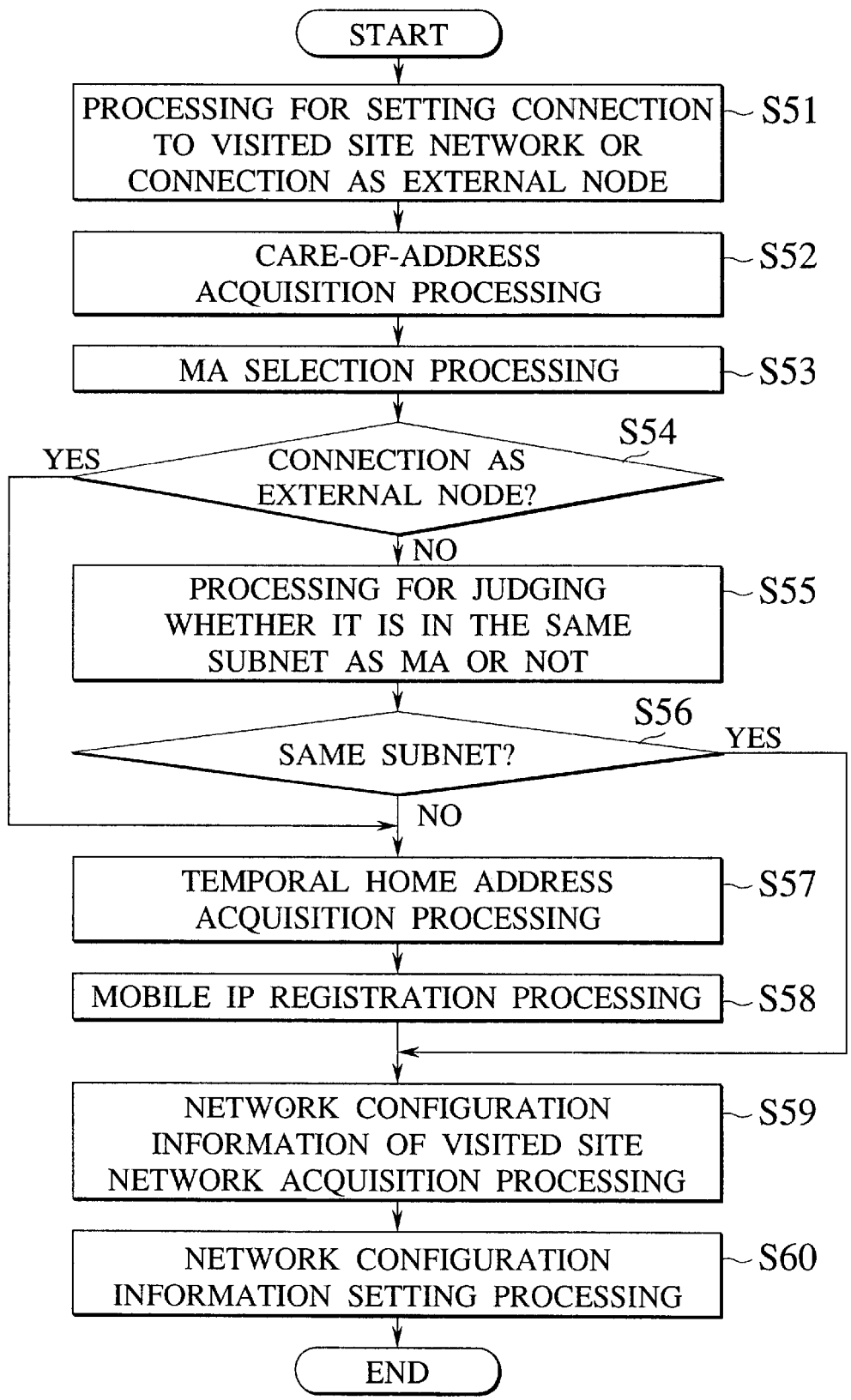
FIG. 18 is a flow chart of an exemplary operation procedure for a mobile computer in another exemplary situation (example 2) according to one embodiment of the present invention.
Figure 19:
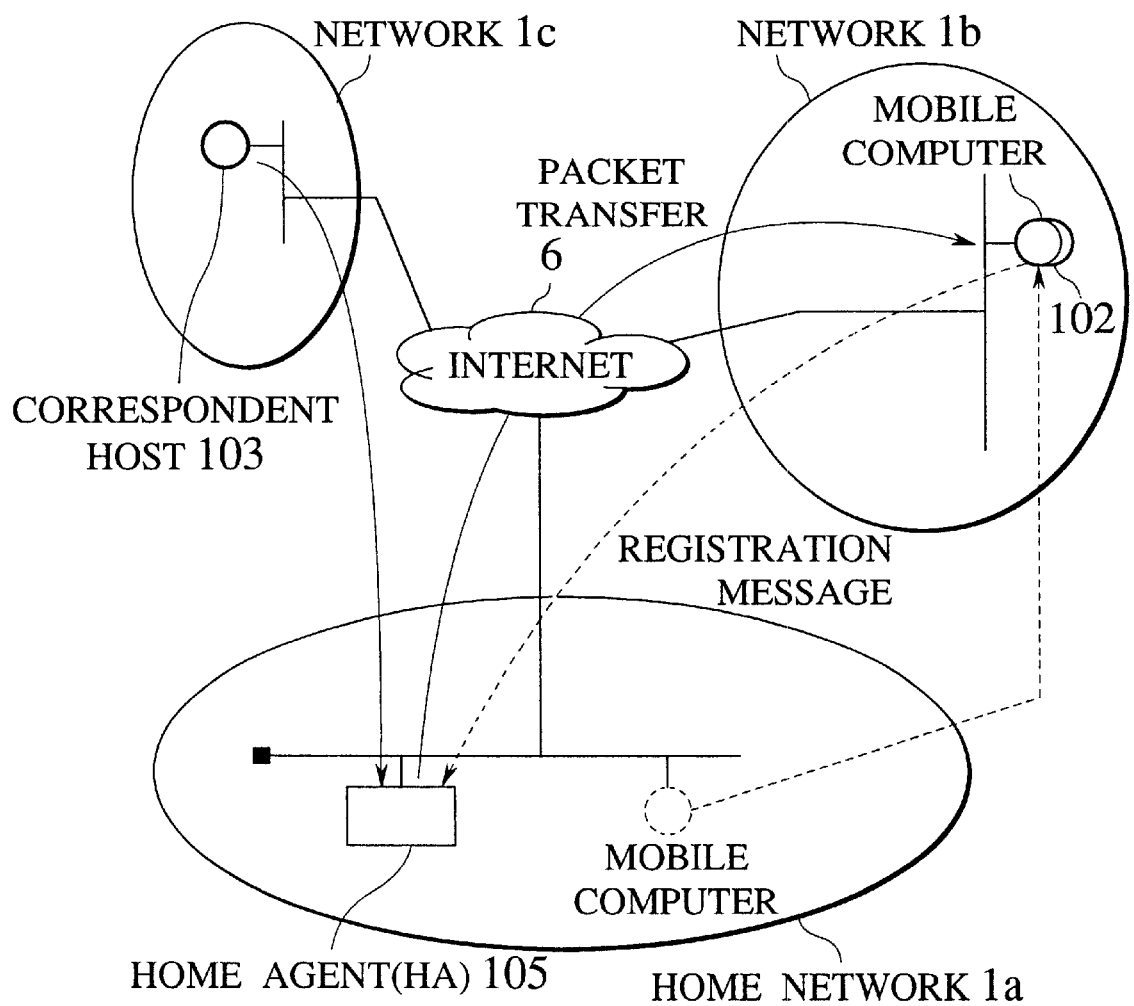
FIG. 19 is a schematic diagram for explaining the conventional mobile IP scheme.

An exemplary operation procedure of the mobile computer 2 in this example is shown in FIG. 18. Here, the overall control of this procedure is to be carried out by a controller (not shown) provided in the mobile computer 2. In this procedure of FIG. 18, the steps S51 to S60 corresponds to the steps S33 to S42 of the procedure of FIG. 16, respectively, while the steps S31, S32 and S43 of the procedure of FIG. 16 are omitted.

(Other variations)

In the example 1, variation 1 and variation 2 described above, in the case of moving as an external node, the mobile computer management server in any network can be selected in principle in the case of moving as an external node, whereas only the mobile computer management server in the original home network can be selected in the case where the mobile computer is located in the original home network, and only the mobile computer management server in the original home network or the mobile computer management server in the visited site network can be selected in the case where the mobile computer is located in the visited site network outside the original home network. However, it is also possible to modify the example 1, variation 1 and variation 2 such that the mobile computer management server in any network can be selected even in the case where the mobile computer is located in the original home network or in the visited site network outside the original home network, just as in the case of moving as an external node.

Also, similarly, it is possible to modify the example 2 described above such that the mobile computer management server in any network can be selected in the case where the mobile computer is located in the visited site network, just as in the case of moving as an external node.

In addition, in the above described examples and variations, it is also possible to use a configuration without the function for carrying out the mobile IP communication by regarding the nearby network as a home network in the case of the connection as an external node at the visited site.

Moreover, it is also possible to use a configuration which only has the function for carrying out the mobile IP communication by regarding the nearby network as a home network in the case of the connection as an external node at the visited site.

Also, as already mentioned above, in the case where the mobile computer is located in the same subnet as the mobile computer management server in the visited site network, it is possible to carry out the communications using the private address rather than the Care-of-address.

Besides these, thee are many possible variations for the mobile computer depending on what functions regarding the mobile IP are to be provided, which parts are to be made automatic, whether it has the original home network or not, and so on.

Note also that the above description is directed to the mobile computer management server which is provided with both a function for managing the mobile IP communication of the mobile computer as a guest by regarding the network to which the mobile computer belongs as a home network and the function for managing the mobile IP communication of the mobile computer using the network to which the mobile computer belongs as the original home network, but it is also possible to separately provide a home agent for guest which manages the mobile IP communication of the mobile computer as a guest by regarding the network to which the mobile computer belongs as a home network, and an original home agent which manages the mobile IP communication of the mobile computer using the network to which the mobile computer belongs as the original home network.

Also, the above description is directed to a case where the acquisition and the setting of the network configuration information are carried out automatically through the exchange of messages between the mobile computer and the mobile computer management server, but it is also possible to carry out the acquisition and the setting of the network configuration information manually.

Note that the present invention is applicable not only to the mobile IP protocol as specified by RFC 2002 or RFC 2003, but also to any other various mobile communication protocols that are currently proposed.

Note also the each function described in this embodiment can be realized as either hardware or software. In the case of software realization, it is possible to implement a computer readable medium that records programs for causing the computer to execute each procedure or realize each function.

As described, according to the present invention, it becomes possible for the mobile computer device to construct the mobile IP communication environment by regarding the visited site network or the nearby network of the visited site as a home network.

Moreover, the mobile computer device automatically selects the nearby mobile computer management device at the visited site, acquires the network configuration information of the network to be regarded as a home network and automatically sets it to the communication program, so that it becomes possible to construct the mobile IP communication environment by regarding the nearby network as a home network automatically.

Furthermore, according to the present invention, it becomes possible for the mobile computer management device to provide an environment for carrying out the mobile IP communication by regarding the network to which the mobile computer management device belongs as a home network, with respect to the mobile computer device that has moved into that network or its vicinity as an external node.

In addition, the mobile computer management device provides the network configuration information in response to a request from the mobile computer device, so that it becomes possible for the mobile computer device to construct the mobile IF communication environment by automatically setting that information to the communication program and automatically regarding that network as a home network.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile computer device capable of carrying out communications while moving over inter-connected networks including a first network that is an original home network of the mobile computer device and a second network that is a visited site network of the mobile computer device, the mobile computer device comprising:

an exchange processing unit configured to receive a network configuration information of the second network from a management device of the second network at a time of moving from the first network to the second network, when it is possible to receive the network configuration information from the management device of the second network; and a communication control unit configured to control communications by selecting a new communication setting that indicates the second network as a home network of the mobile computer device or an original communication setting that indicates the first network as a home network of the mobile computer device, when the network configuration information received from the management device of the second network contains a home address information of the management device of the second network.

\* \* \* \* \*